(12) United States Patent
Ichimura

(10) Patent No.: US 12,014,709 B2
(45) Date of Patent: Jun. 18, 2024

(54) TRANSMISSION DEVICE, TRANSMISSION METHOD, RECEPTION DEVICE AND RECEPTION METHOD

(71) Applicant: SONY GROUP CORPORATION, Tokyo (JP)

(72) Inventor: Gen Ichimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 9 days.

(21) Appl. No.: 17/632,633

(22) PCT Filed: Jul. 21, 2020

(86) PCT No.: PCT/JP2020/028333
§ 371 (c)(1),
(2) Date: Jun. 9, 2022

(87) PCT Pub. No.: WO2021/049181
PCT Pub. Date: Mar. 18, 2021

(65) Prior Publication Data
US 2023/0186882 A1 Jun. 15, 2023

(30) Foreign Application Priority Data
Sep. 10, 2019 (JP) .................................. 2019-164366

(51) Int. Cl.
*G10H 1/00* (2006.01)
(52) U.S. Cl.
CPC ...... *G10H 1/0066* (2013.01); *G10H 2240/255* (2013.01); *G10H 2240/265* (2013.01)
(58) Field of Classification Search
CPC ........... G10H 1/0066; G10H 2240/255; G10H 2240/265
See application file for complete search history.

(56) References Cited

U.S. PATENT DOCUMENTS 5,933,430 A * 8/1999 Osakabe .......... H04N 21/43632
375/E7.025
6,143,973 A * 11/2000 Kikuchi ............... G10H 1/0066
84/645

(Continued)

FOREIGN PATENT DOCUMENTS

EP 0762684 A 3/1997
EP 0762684 A2 * 3/1997 ............... H04H 1/00

(Continued)

OTHER PUBLICATIONS

Anonym: "Universal MIDI Packet (UMP) Format and MIDI 2.0 Protocol-M2-104-UM-V1.0", Feb. 20, 2020 (Feb. 20, 2020), pp. 1-82, XP055827024, InternetRetrieved from the Internet:URL:http://www.midi.org/[retrieved on Jul. 22, 2021].

*Primary Examiner* — Jeffrey Donels
(74) *Attorney, Agent, or Firm* — Paratus Law Group, PLLC

(57) ABSTRACT

A new interface is provided that supports simultaneous transmission of an audio signal and a MIDI signal. Signals consecutive in predetermined units are transmitted to a reception side via a predetermined transmission path. The signals consecutive in the predetermined units include a signal of a first predetermined unit of the predetermined units including an audio signal and a signal of a second predetermined unit of the predetermined units including a MIDI signal. For example, the audio signal is a linear PCM signal constituting a stereo 2-channel audio signal. For example, the MIDI signal includes packet data of a predetermined length, and the packet data of the predetermined length is divided into a plurality of pieces, and transmitted by being included in signals of a plurality of pieces of the second predetermined units.

20 Claims, 21 Drawing Sheets

(56) References Cited

U.S. PATENT DOCUMENTS

| | | | |
|---|---|---|---|
| 6,353,169 B1 * | 3/2002 | Juszkiewicz | G10H 1/0058 84/645 |
| 6,686,530 B2 * | 2/2004 | Juszkiewicz | G10H 1/0058 84/645 |
| 6,828,498 B2 * | 12/2004 | Sugiyama | G10H 1/0066 84/645 |
| 6,979,769 B1 * | 12/2005 | Majima | G10H 1/0066 84/645 |
| 2003/0196540 A1 * | 10/2003 | Ishii | G10H 1/0066 84/617 |
| 2005/0188097 A1 * | 8/2005 | Ichimura | H04L 65/1101 709/231 |

FOREIGN PATENT DOCUMENTS

| | | | | |
|---|---|---|---|---|
| EP | 1087557 A2 * | 3/2001 | | H04L 12/40058 |
| EP | 1172796 A | 1/2002 | | |
| JP | H09-116593 A | 5/1997 | | |
| JP | 2000-244424 A | 9/2000 | | |
| JP | 2002-232375 A | 8/2002 | | |
| JP | 2003-316356 A | 11/2003 | | |

* cited by examiner

FIG. 2

MIDI 2.0 Message

| MT | Packet Size | Description |
|---|---|---|
| 0x0 | 32 bits | Utility Messages |
| 0x1 | 32 bits | System Real Time and System Common Messages (except System Exclusive) |
| 0x2 | 32 bits | MIDI 1.0 Channel Voice Messages |
| 0x3 | 64 bits | Data Messages (including System Exclusive) |
| 0x4 | 64 bits | MIDI 2.0 Channel Voice Messages |
| 0x5 | 128 bits | Data Messages |
| 0x6 | 32 bits | Reserved |
| 0x7 | 32 bits | Reserved |
| 0x8 | 64 bits | Reserved |
| 0x9 | 64 bits | Reserved |
| 0xA | 64 bits | Reserved |
| 0xB | 96 bits | Reserved |
| 0xC | 96 bits | Reserved |
| 0xD | 128 bits | Reserved |
| 0xE | 128 bits | Reserved |
| 0xF | 128 bits | Reserved |

FIG. 3

MIDI 2.0 Note On Message

| mt=4 | group | 1 | 0 | 0 | 1 | channel | r | note number | attribute type |
|---|---|---|---|---|---|---|---|---|---|
| velocity | | | | | | | | attribute | |

FIG. 9

IEC 60958-5
Channel Status

| | 0 | 1 | 2 | 3 | 4 | 5 | 6 | 7 |
|---|---|---|---|---|---|---|---|---|
| 0 | a="0" | b="0" | c | d="001": multichannel LPCM | | | Mode="00" | |
| 1 | | | | | | | | |
| 2 | | | | | | | | |
| 3 | | | | | | | | |
| 4 | | | | | | | | |
| 5 | | | | | | | | |
| 6 | 49 Multichannel Configuration Type: "0 0 0 0": No information "1 1 1 0": MIDI 2.0 configuration | | 50 | 51 | 52 | 53 configuration value "0000 0000": reserved "1000 0000": Lch/Rch/MIDI 2.0 Other: reserved | | 55 |
| 7 | 56 | 57 configuration value | | 58 | 59 | 60 | | |
| ... | ... | | | | | | | |
| 21 | | | | | | | | |
| 22 | | | | | | | | |
| 23 | | | | | | | | 191 |

FIG. 10

BITSTREAM METHOD

(a)
| Preamble | LSB | MIDI 1.0 data payload | MSB | LSB | Not used (0) | MSB | V | U | C | P |
|---|---|---|---|---|---|---|---|---|---|---|
| 0 | 3 | 4 | | 19 | 20 | 27 | 28 | | | 31 |

BYTE ALIGNMENT METHOD

(b)
| Preamble | LSB | Not used (0) | MSB | LSB | MIDI 1.0 Byte | MSB | LSB | Not used (0) | MSB | V | U | C | P |
|---|---|---|---|---|---|---|---|---|---|---|---|---|---|
| 0 | 3 | 4 | | 11 | 12 | | 19 | 20 | 27 | 28 | | | 31 |

FIG. 11

DATA EXTENSION METHOD (a)
| Preamble | LSB Extended Byte | MSB | LSB MIDI 1.0 Byte | MSB | V | U | C | P |
|---|---|---|---|---|---|---|---|---|
| 0 | 3 4 | | 11 12 | 19 20 Not used (0) | 27 28 | | | 31 |

8 + 7 = 15 bits (b)
| Preamble | LSB Extended Status Byte | MSB 1 | LSB Status Byte | MSB | V | U | C | P |
|---|---|---|---|---|---|---|---|---|
| 0 | 3 4 | | 11 12 | 19 20 Not used (0) | 27 28 | | | 31 |

7 + 7 = 14 bits (c)
| Preamble | LSB Extended Data Byte | MSB 0 | LSB Data Byte | MSB | V | U | C | P |
|---|---|---|---|---|---|---|---|---|
| 0 | 3 4 | | 11 12 | 19 20 Not used (0) | 27 28 | | | 31 |

7 + 7 = 14 bits

FIG. 15

IEC 61937-1 Channel Status

| | 0 | 1 | 2 | 3 | 4 | 5 | 6 | 7 |
|---|---|---|---|---|---|---|---|---|
| 0 | a="0" | b="1" | c | d="100" | | | Mode="00" | |
| 1 | | | | | | | | |
| 2 | | | | | | | | |
| 3 | | | | | | | | |
| 4 | | | | | | | | |
| 5 | | | | | | | | |
| 6 | 49 Multichannel Configuration Type: "0 0 0 0": No information "1 1 1 0": MIDI configuration | 50 | 51 | 52 | 53 configuration value "0000 0000": MIDI 2.0 "1000 0000": reserved "0100 0000": MIDI 1.0 bitstream "1100 0000": MIDI 1.0 byte alignment "0010 0000": MIDI 1.0 and extension "1010 0000": MIDI A/B | 54 | 55 |
| 7 | 56 | 57 | 58 configuration value | 59 | 60 | | | |
| ... | | | | ... | | | | |
| 21 | | | | | | | | |
| 22 | | | | | | | | |
| 23 | | | | | | | | 191 |

TRANSMISSION DEVICE, TRANSMISSION METHOD, RECEPTION DEVICE AND RECEPTION METHOD

CROSS REFERENCE TO PRIOR APPLICATION

This application is a National Stage Patent Application of PCT International Patent Application No. PCT/JP2020/028333 (filed on Jul. 21, 2020) under 35 U.S.C. § 371, which claims priority to Japanese Patent Application No. 2019-164366 (filed on Sep. 10, 2019), which are all hereby incorporated by reference in their entirety.

TECHNICAL FIELD

The present technology relates to a transmission device, a transmission method, a reception device, and a reception method.

BACKGROUND ART

With the serial digital interface standard of IEEE 1394, stable simultaneous transmission of an audio signal and a MIDI (Musical Instrument Digital Interface) signal is conventionally achieved. For example, Patent Document 1 describes IEEE 1394 and MIDI signals.

Production of products using IEEE 1394 has been stopped due to emergence of High-Definition Multimedia Interface (HDMI), and a computer-based universal serial bus (USB) has been used for simultaneous transmission of an audio signal and a MIDI signal. Furthermore, HDMI does not support simultaneous transmission of an audio signal and a MIDI signal.

Furthermore, as a digital audio interface, transmission of a linear PCM signal by IEC 60958 is widely used. Furthermore, IEC 61937 that transmits a compressed audio signal on the protocol of IEC 60958 has also been widespread, and is used for various audio codec transmissions.

These are commercially used in actual products by mapping the IEC 60958 protocol to formats of: a coaxial terminal and an optical out terminal that are called Sony Philips Digital Interface (SPDIF); a high-definition multimedia interface (HDMI) that is a multimedia interface including a video; a mobile high-definition link (MHL); and a display port (Display Port).

CITATION LIST

Patent Document

Patent Document 1: Japanese Patent Application Laid-Open No. 9-116593

SUMMARY OF THE INVENTION

Problems to be Solved by the Invention

In a case where a computer is used, latency and a maximum amount of data greatly depend on performance of the computer to be used, a device driver, and software. For that reason, in the case where the computer is used, there is a problem that real time property is impaired or data loss occurs. There is a demand for a real-time interface that can be used stably and reliably.

An object of the present technology is to provide a new interface that supports simultaneous transmission of an audio signal and a MIDI signal.

Solutions to Problems

A concept of the present technology is in
a transmission device including
a transmission unit that transmits signals consecutive in predetermined units to a reception side via a predetermined transmission path, in which
the signals consecutive in the predetermined units include a signal of a first predetermined unit of the predetermined units including an audio signal and a signal of a second predetermined unit of the predetermined units including a MIDI signal.

In the present technology, the signals consecutive in the predetermined units are transmitted to the reception side via the predetermined transmission path by the transmission unit. For example, the predetermined units may be subframe units. Furthermore, for example, the predetermined transmission path may be a coaxial cable, an optical cable, an Ethernet (IEC 61883-6) cable, an HDMI cable, an MHL cable, or a display port cable.

In the signals consecutive in the predetermined units, the signal of the first predetermined unit including the audio signal and the signal of the second predetermined unit including a MIDI signal are included. For example, the audio signal may be a linear PCM signal constituting a stereo 2-channel audio signal. In this case, simultaneous transmission of the stereo 2-channel audio signal and the MIDI signal can be stably performed.

For example, the MIDI signal may include packet data of a predetermined length, and the packet data of the predetermined length may be divided into a plurality of pieces, and transmitted by being included in signals of a plurality of pieces of the second predetermined units. In this case, for example, the packet data of the predetermined length may be 32-bit, 64-bit, 96-bit, or 128-bit packet data, and divided into a plurality of pieces of 16 bits each. By dividing and transmitting the data as described above, transmission is possible even in a case where the data length of the packet data constituting the MIDI signal exceeds a data payload area in the signals of the predetermined units.

Furthermore, in this case, for example, in the signal of the second predetermined unit including the MIDI signal, the MIDI signal may be inserted on a lower bit side, and identification information may be inserted on an upper bit side, the identification information identifying whether the MIDI signal inserted on the lower bit side is at least divided data of start or divided data of continuation. The identification information is inserted as described above, whereby the reception side can identify whether the MIDI signal included in the signal of the second predetermined unit is the divided data of start or the divided data of continuation, and can correctly reconfigure and receive the packet.

Then, in this case, for example, the identification information may be set to cause a volume to be less than or equal to a predetermined value even when data of a predetermined bit number including the MIDI signal on the lower bit side and the identification information on the upper bit side is reproduced as audio data. As a result, even if the data is erroneously reproduced as audio data, damage to an audio amplifier and a speaker can be avoided.

Furthermore, for example, packet data constituting the MIDI signal may be inserted from an arbitrary bit position in a data payload area of the signal of the second predetermined unit, and in a case where all the packet data are not able to be inserted into the data payload area, remaining part of the packet data may be inserted from a first bit position in a data payload area of the signal of a next one of a plurality of the second predetermined units, and the packet data constituting the MIDI signal may be transmitted. In this case, the packet data can be inserted into the data payload area of the signal of the second predetermined unit in accordance with a generation timing of the MIDI signal.

Furthermore, for example, packet data of one byte constituting the MIDI signal may be inserted into one byte area of a data payload area of two bytes in the signal of the second predetermined unit and transmitted. In this case, since the packet data constituting the MIDI signal is inserted along byte alignment, the processing on the reception side can be simplified.

Furthermore, for example, packet data of one byte constituting the MIDI signal may be inserted into one byte area of a data payload area of two bytes in the signal of the second predetermined unit, and another area of one byte may be set as an extended byte area and transmitted. In this case, using the extended byte area, unique extension can be performed, for example, high resolution of velocity, an increase in the number of channels, and the like.

Furthermore, for example, the signal of the second predetermined unit may include a plurality of channels of the MIDI signals. As a result, a plurality of systems of the MIDI signals can be virtually transmitted, and the number of channels can be increased.

As described above, in the present technology, the signal of the first predetermined unit including the audio signal and the signal of the second predetermined unit including the MIDI signal are included in the signals consecutive in the predetermined units transmitted. For that reason, simultaneous transmission of the audio signal and the MIDI signal can be stably performed.

Note that, in the present technology, for example, an information addition unit may be further included that adds, to the signals consecutive in the predetermined units, identification information that identifies that the signals include a signal of a first predetermined unit of the predetermined units including an audio signal and a signal of a second predetermined unit of the predetermined units including a MIDI signal. In this case, for example, the information addition unit may add the identification information by using a predetermined bit area of each of blocks configured for each of a predetermined number of the predetermined units. The identification information is added as described above, whereby a reception side can easily recognize that the signals consecutive in the predetermined units include the signal of the first predetermined unit including the audio signal and the signal of the second predetermined unit including the MIDI signal.

Furthermore, another concept of the present technology is in
    a reception device including
    a reception unit that receives signals consecutive in predetermined units from a transmission side via a predetermined transmission path, in which
        the signals consecutive in the predetermined units include a signal of a first predetermined unit of the predetermined units including an audio signal and a signal of a second predetermined unit of the predetermined units including a MIDI signal.

In the present technology, the consecutive signals in the predetermined units are received from the transmission side via the predetermined transmission path by the reception unit. In the signals consecutive in the predetermined units, the signal of the first predetermined unit including the audio signal and the signal of the second predetermined unit including a MIDI signal are included. For example, the audio signal may be a linear PCM signal constituting a stereo 2-channel audio signal. In this case, the stereo 2-channel audio signal and the MIDI signal can be received simultaneously and stably.

As described above, in the present technology, the signal of the first predetermined unit including the audio signal and the signal of the second predetermined unit including the MIDI signal are included in the signals consecutive in the predetermined units received. For that reason, simultaneous reception of the audio signal and the MIDI signal can be stably performed.

Note that, in the present technology, for example, a processing unit may be further included that performs processing using the audio signal and the MIDI signal. In this case, it is possible to perform processing using the audio signal and the MIDI signal that are stably and simultaneously received. In this case, for example, the processing unit may synthesize the audio signal with an audio signal obtained by using a MIDI sound source from the MIDI signal to obtain an output audio signal.

BRIEF DESCRIPTION OF DRAWINGS

FIG. 2 is a diagram illustrating an example of a message to be inserted into a universal MIDI packet in MIDI 2.0.

FIG. 3 is a diagram illustrating a configuration example of a note on message in MIDI 2.0.

FIG. 9 is a diagram schematically illustrating a format of a channel status in a case where a linear PCM signal and a MIDI signal are simultaneously transmitted.

FIG. 10 is a diagram illustrating an example of an insertion method into a sub-frame in a case where a linear PCM signal and a MIDI signal of MIDI 1.0 are simultaneously transmitted.

FIG. 11 is a diagram illustrating an example of the insertion method into the sub-frame in the case where the linear PCM signal and the MIDI signal of MIDI 1.0 are simultaneously transmitted.

FIG. 15 is a diagram schematically illustrating a format of a channel status in the case where only the MIDI signal is transmitted.

MODE FOR CARRYING OUT THE INVENTION

The following is a description of a mode for carrying out the invention (the mode will be hereinafter referred to as the "embodiment"). Note that, explanation will be made in the following order.

1. First Embodiment
2. Second Embodiment
3. Third Embodiment
4. Fourth Embodiment
5. Modifications

1. First Embodiment

[Configuration Example of Transmission/Reception System]

Figure 1:
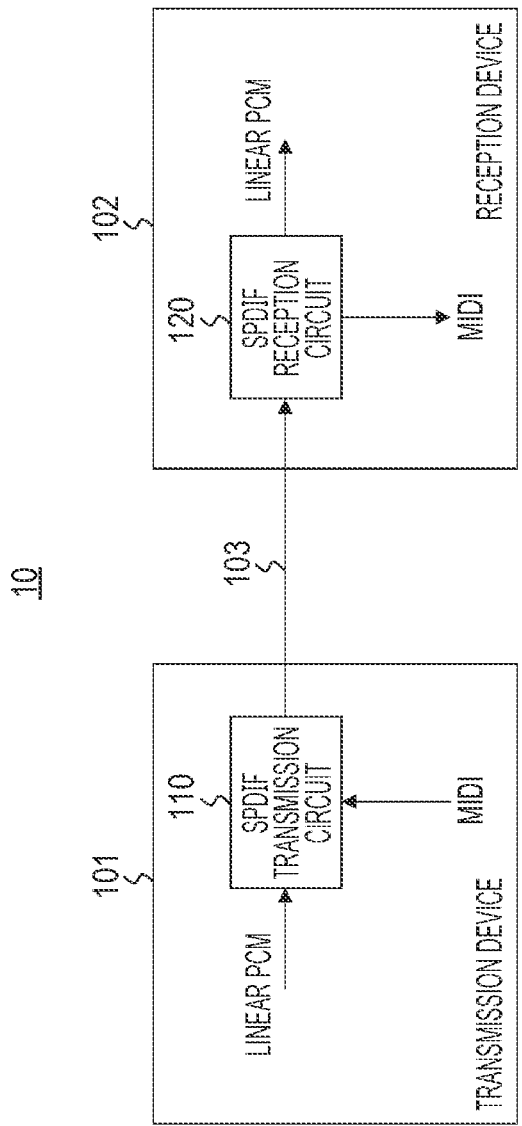
FIG. 1 is a block diagram illustrating a configuration example of a transmission/reception system as a first embodiment.

FIG. 1 illustrates a configuration example of a transmission/reception system 10 as a first embodiment. The transmission/reception system 10 includes a transmission device 101 and a reception device 102. The transmission device 101 and the reception device 102 are connected to each other via a transmission path 103 including a coaxial cable, an optical cable, or the like. The transmission path 103 constitutes an IEC 60958 transmission path.

The transmission device 101 includes a Sony Philips Digital Interface (SPDIF) transmission circuit 110. The SPDIF transmission circuit 110 is a circuit for transmitting an IEC 60958 standard digital audio transmission signal (hereinafter, referred to as a "SPDIF signal", as appropriate), and is a transmission circuit conforming to the IEC 60958 standard.

The SPDIF transmission circuit 110 generates an SPDIF signal simultaneously including a linear PCM signal and a Musical Instrument Digital Interface (MIDI) signal, and transmits the SPDIF signal to the reception device 102 through the transmission path 103. As the linear PCM signal, audio signals such as mono, 2-channel, 5.1-channel, 7.1-channel, 10.2-channel, and 22.2-channel signals are conceivable, but a stereo 2-channel audio signal is considered here. Furthermore, as the MIDI signal, a MIDI signal proposed as MIDI 2.0 is considered.

The reception device 102 includes an SPDIF reception circuit 120. The SPDIF reception circuit 120 is a circuit for receiving an SPDIF signal (IEC 60958 standard digital audio transmission signal), and is a reception circuit conforming to the IEC 60958 standard. The SPDIF reception circuit 120 receives the SPDIF signal transmitted from the transmission device 101 through the transmission path 103, and extracts and outputs the linear PCM signal and the MIDI signal included in the SPDIF signal.

"Message in MIDI 2.0"

In MIDI 2.0, universal MIDI packets respectively having a plurality of packet lengths are defined. The packet lengths include 32 bits, 64 bits, 96 bits, 128 bits, and the like. A message to be inserted into the universal MIDI packet is proposed as illustrated in FIG. 2.

The definition of "Utility Messages" has not been disclosed. In MIDI 1.0, "System Real Time Messages" are valid messages for all units connected to a system, include only a status byte and do not include a data byte, and can be transmitted between bytes of other messages. "System Common Messages" are valid messages for all the units connected to the system in MIDI 1.0.

"System Exclusive Messages" are messages that can transmit any number of bytes of data following the status byte in MIDI 1.0. "MIDI 1.0 Channel Voice Messages" are messages in which "Channel Voice Messages" of up to three bytes in MIDI 1.0 are mapped to "Universal MIDI Packet" of four bytes in MIDI 2.0.

The definition of "Data Messages (including System Exclusive Message)" has not been disclosed. "MIDI 2.0 Channel Voice Messages" are messages newly provided in MIDI 2.0 and have an extended data resolution. The definition of "Data Messages" has not been disclosed.

For example, regarding a note on message (MIDI 2.0 Note On Message) among these messages, a format illustrated in FIG. 3 has been proposed. The packet length of the note on message is 64 bits (8 bytes).

A 4-bit field of "mt" is newly provided in MIDI 2.0, indicates a message type, and mt=4 here. A 4-bit field "group" is newly provided in MIDI 2.0 and indicates a group. Each of groups is independent, and each group has 16 MIDI channels. Thus, a MIDI signal of one system can have up to 256 channels.

A 4-bit feel of "channel" indicates a MIDI channel. One physical MIDI signal line is divided into 16 logical channels by a 4-bit channel number included in a MIDI channel message. The definition of 1-bit field of "r" has not been disclosed. A 7-bit field of "note number" indicates a keyboard number. This number takes a value from 0 to 127, and the number of "do" in the middle of an 88 key piano is 60.

An 8-bit field of "attribute type" is newly provided in MIDI 2.0, and indicates an additional data type. As this type, articulation, tuning details, and the like are conceivable. A 16-bit field of "velocity" indicates strength of hitting a keyboard, and is used to make a difference in strength between sounds. A 16-bit field of "attribute" is newly provided in MIDI 2.0 and indicates a value of additional data of a type defined by "attribute type".

"SPDIF Signal"

The SPDIF signal (IEC 60958 standard digital audio transmission signal) generated by the SPDIF transmission circuit 110 will be described.

Figure 4:
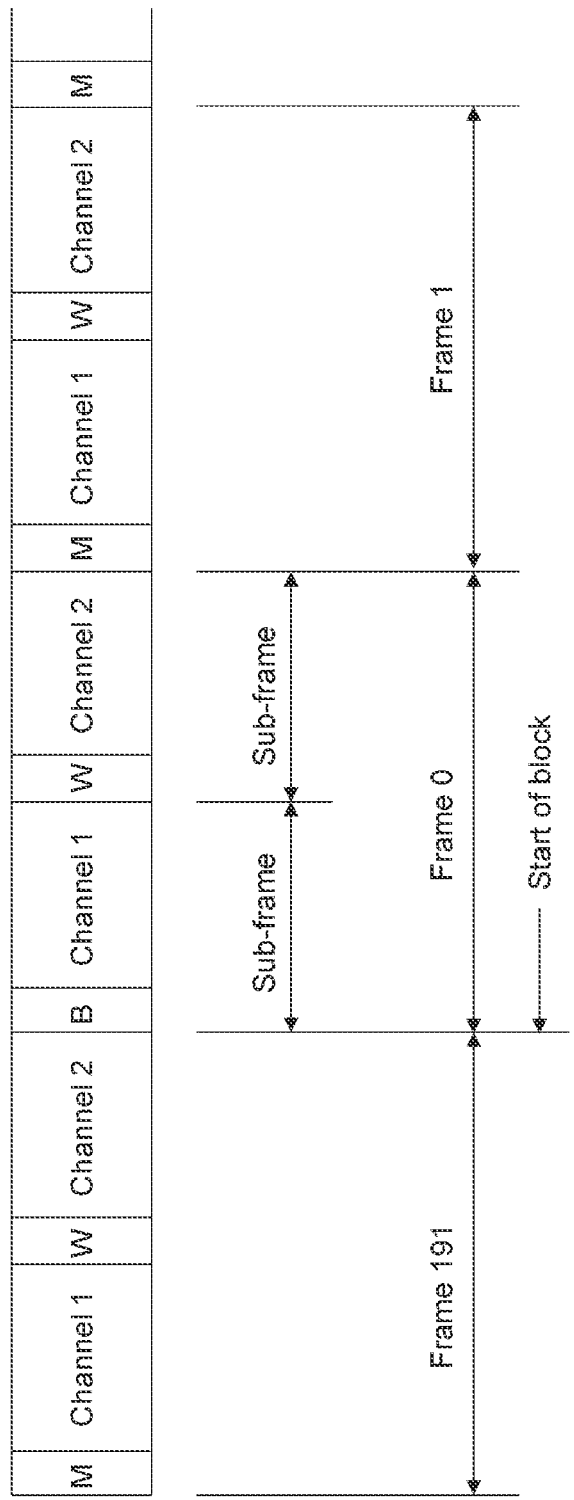
FIG. 4 is a diagram illustrating a frame configuration in the IEC 60958 standard.

First, an outline of the IEC 60958 standard will be described. FIG. 4 illustrates a frame configuration in the IEC 60958 standard. Each frame includes two sub-frames. In the case of stereo 2-channel audio, a left channel signal is included in the first one of the sub-frames and a right channel signal is included in the second one of the sub-frames.

A preamble is provided at the head of the sub-frame, "M" is given as the preamble to the left channel signal, and "W" is given as the preamble to the right channel signal. However, "B" representing the start of a block is given to the preamble at the head for every 192 frames. That is, one block includes 192 frames. The block is a unit constituting a channel status to be described later.

Figure 5:
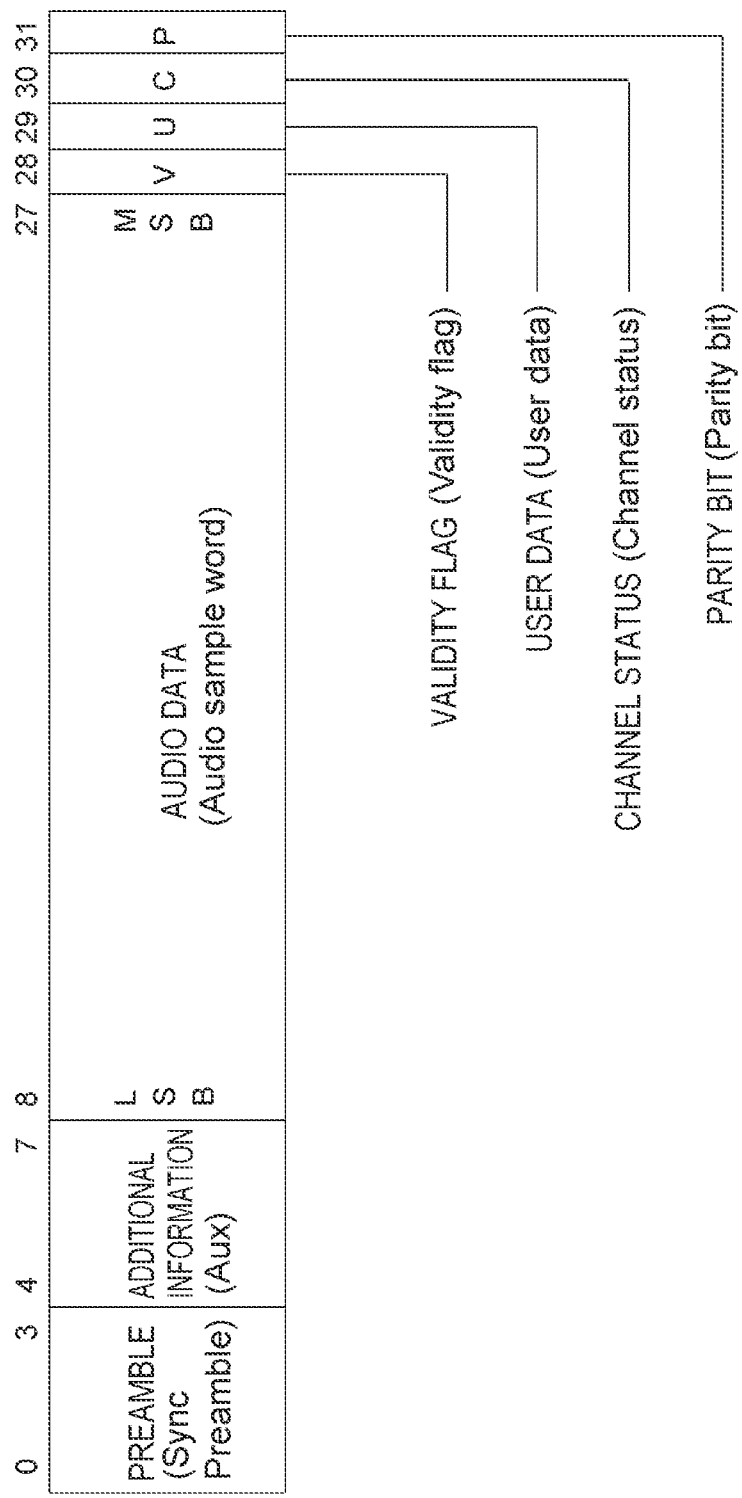
FIG. 5 is a diagram illustrating a sub-frame configuration in the IEC 60958 standard.

FIG. 5 illustrates a sub-frame configuration in the IEC 60958 standard. The sub-frame includes a total of 32 time slots from the 0th to 31st time slots. The 0th to 3rd time slots indicate a preamble (Sync preamble). As described above, the preamble indicates any of "M", "W", or "B" to represent distinction between the left and right channels and a start position of the block.

The 4th to 27th time slots represent a main data field, and in a case where a 24-bit code range is adopted, the time slots all represent audio data. Furthermore, in a case where the 20-bit code range is adopted, the 8th to 27th time slots represent audio data (Audio sample word). In the latter case, the 4th to 7th time slots can be used as additional information (Auxiliary sample bits). The illustrated example indicates the latter case.

The 28th time slot is a validity flag (Validity flag) of the main data field. The 29th time slot represents one bit of user data (User data). A series of user data can be configured by accumulating the 29th time slot over frames. A message of the user data is configured in units of 8-bit information units (IU), and one message includes 3 to 129 information units.

There may be "0" of zero to eight bits between the information units. The head of the information unit is identified by a start bit "1". First seven information units in the message are reserved, and a user can set any information in the eighth and subsequent information units. Messages are divided by "0" of eight bits or more.

The 30th time slot represents one bit of the channel status (Channel status). A series of channel statuses may be configured by accumulating the 30th time slot for each block over frames. Note that, the head position of the block is indicated by the preamble of "B" (the 0th to 3rd time slots) as described above.

The 31st time slot is a parity bit (Parity bit). This parity bit is given so that the numbers of "0" and "1" included in the 4th to 31st time slots are even numbers.

Figure 6:
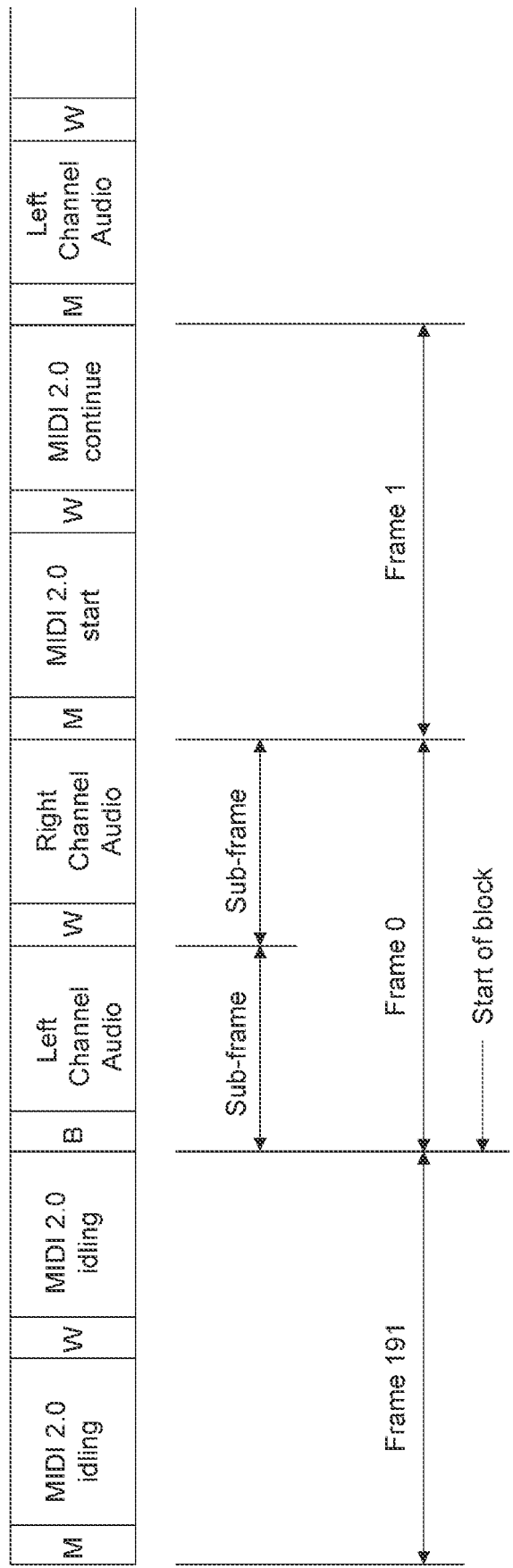
FIG. 6 is a diagram illustrating an example of a frame configuration of an SPDIF signal in a case where a stereo 2-channel audio signal as a linear PCM signal and a MIDI signal are simultaneously included.

In this embodiment, as described above, the SPDIF signal simultaneously includes the stereo 2-channel audio signal as the linear PCM signal, and the MIDI signal. FIG. 6 illustrates an example of a frame configuration of the SPDIF signal in that case. The SPDIF signal is signals consecutive in sub-frame units. One block is constituted by 192 frames, and a plurality of the blocks is consecutively included.

An even-numbered frame sub-frame is a sub-frame (first sub-frame) into which an audio signal is inserted. The first one of the sub-frames includes a left-channel audio signal, and the second one of the sub-frames includes a right-channel audio signal. Furthermore, an odd-numbered frame sub-frame is used as a sub-frame (second sub-frame) into which a MIDI signal is inserted. That is, the SPDIF signal includes a signal of the first sub-frame including the audio signal and a signal of the second sub-frame including the MIDI signal.

Figure 7:
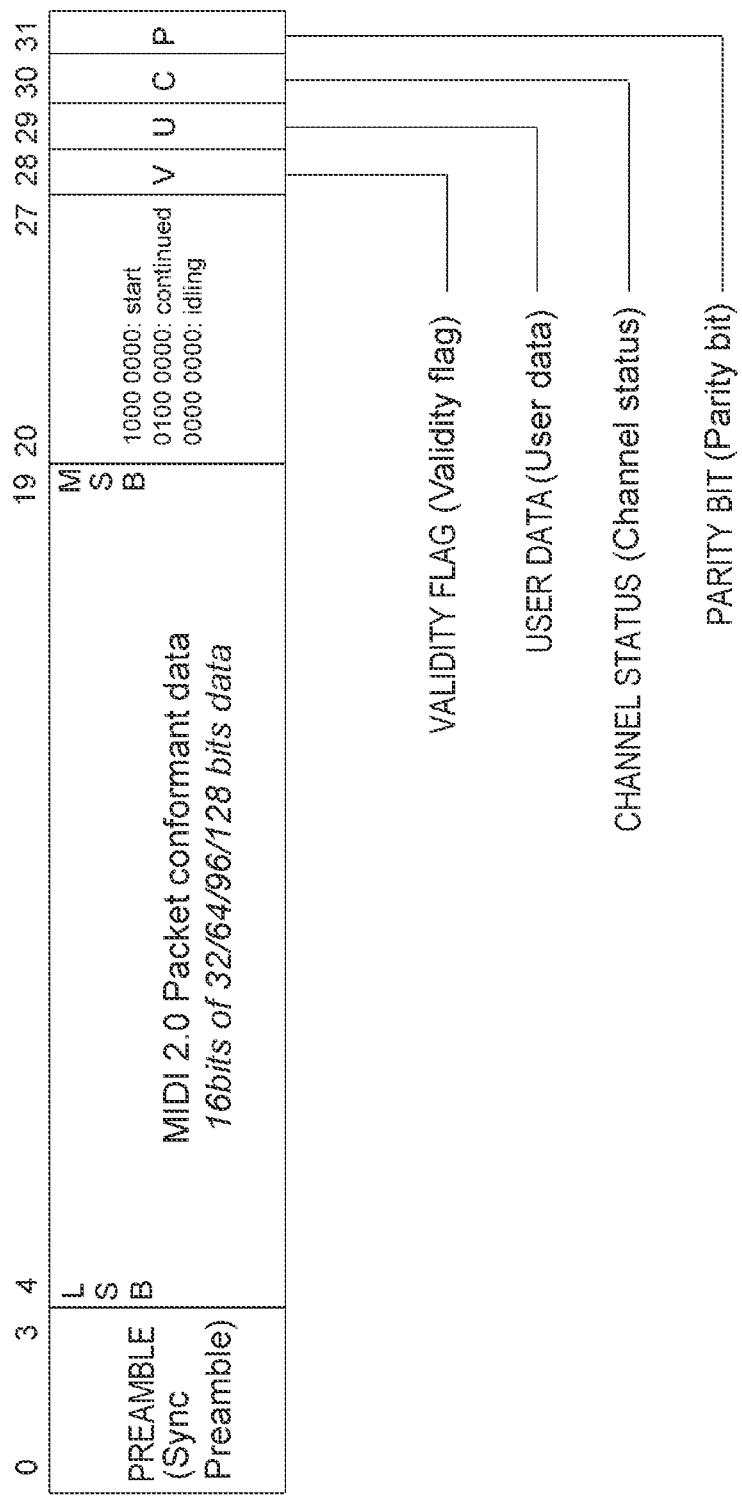
FIG. 7 is a diagram illustrating a configuration example of a sub-frame including a MIDI signal.

FIG. 7 illustrates a configuration of the second sub-frame including the MIDI signal. In this case, the main data field of the 4th to 27th time slots is divided into an area of upper 8 bits and an area of lower 16 bits. The MIDI signal is inserted into the area of the lower 16 bits, and identification information is inserted into the upper 8 bits.

As described above, the packet length of the universal MIDI packet into which the MIDI 2.0 message is inserted is 32 bits, 64 bits, 96 bits, 128 bits, or the like. For that reason, the packet data is divided into a plurality of pieces of 16 bits each, and each piece of divided data is subjected to byte alignment and inserted into the area of the lower 16 bits (area of the 4th bit to the 19th bit) of the main data field in a plurality of the second sub-frames.

The identification information inserted into the area of the upper 8 bits (area of the 20th bit to the 27th bit) of the main data field in the second sub-frame indicates whether the MIDI signal inserted into the area of the lower 16 bits is at least divided data of start or divided data of continuation. For example, 64 bit length packet data is divided into four pieces of 16 bits each, and the divided data at the head is the divided data of start, and other three pieces of divided data are the divided data of continuation.

The identification information is inserted as described above, whereby the reception side can appropriately identify whether the MIDI signal inserted into the area of the lower 16 bits is the divided data of start or the divided data of continuation by checking the identification information of the area of the upper 8 bits, and can correctly reconfigure and receive the packet.

Here, the 8-bit identification information is set so that the volume (volume level) is less than or equal to a predetermined value even when 24-bit data including the 8-bit identification information on the upper bit side and the 16-bit MIDI signal on the lower bit side is reproduced as audio data. As a result, even when the data is erroneously reproduced as audio data on the reception side, damage to an audio amplifier and a speaker can be avoided.

For example, the 8-bit identification information is two bits of the 20th bit and the 21st bit, and indicates the above-described divided data information indicating start or continuation. That is, when the MIDI signal inserted into the area of the lower 16 bits is the divided data of start, the identification information inserted into the area of the upper 8 bits is set as "10000000", and it is indicated that the MIDI signal is the divided data of start.

Furthermore, when the MIDI signal inserted into the area of the lower 16 bits is the divided data of continuation, the identification information inserted into the area of the upper 8 bits is set as "01000000", and it is indicated that the MIDI signal is the divided data of continuation (continued). Furthermore, when no MIDI signal is inserted into the area of the lower 16 bits, the identification information inserted into the area of the upper 8 bits is set as "00000000", and an idling state is indicated in which no MIDI signal is present.

In this case, in a case where 24-bit data including the 8-bit identification information on the upper bit side and 16-bit MIDI signal on the lower bit side are audio data, five bits from 2SB to 6SB are "0" except MSB that is a sign bit, so that even in a case where the data is erroneously reproduced, the volume is less than or equal to −32 dB, and the audio amplifier and the speaker are not damaged.

Note that, a combination of values of the identification information inserted into the area of the upper 8 bits is not limited to the above-described example, and other combinations are also possible. For example, a combination of "10000001", "01000001", and "00000001" also has equivalent functions and effects. Moreover, when the packet length is long and "01000001" continues, to indicate continuity of the data transmission itself, "11000001" is newly introduced and toggled, whereby it is possible to indicate continuity.

That is, the order of the identification signals is "10000001", "01000001", "11000001", "01000001", and "11000001".

Figure 8:
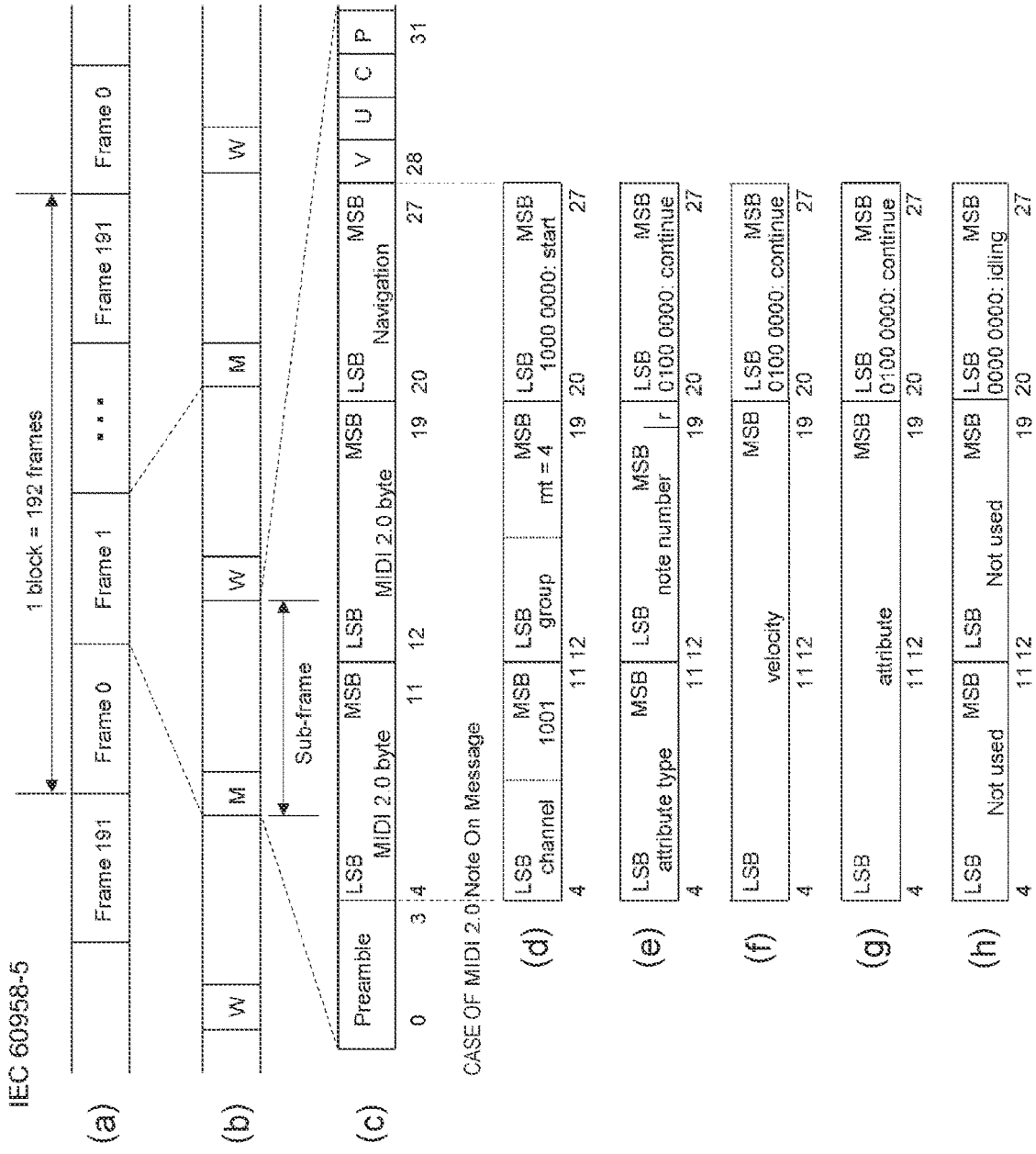
FIG. 8 is a diagram illustrating an example of a case where one note on message of MIDI 2.0 is transmitted.

FIG. 8 illustrates an example of a case where one MIDI 2.0 note on message (see FIG. 3) described above is transmitted. In this case, the packet length of a data packet (universal MIDI packet) of the note on message is 64 bits, and the data packet is divided into four pieces of 16 bits each and inserted into the four second sub-frames.

FIG. 8(*a*) illustrates a frame configuration. One block is constituted by 192 frames, and a plurality of the blocks is consecutively included. FIG. 8(*b*) illustrates that each frame includes two sub-frames. FIG. 8(*c*) illustrates a sub-frame configuration (see FIG. 7).

For example, in a case where four pieces of divided data obtained by dividing the data packet of the note on message are inserted from a frame 1, the four pieces of divided data are inserted into the first one and second one of the sub-frames of the frame 1 and the first one and second one of the sub-frames of a frame 3.

FIG. 8(*d*) illustrates a state of the main data field of the 4th to 27th time slots in the first one of the sub-frames of the frame 1. Data of the respective fields of "mt", "group", "1001", and "channel" constituting the divided data of start are inserted sequentially from the MSB side into the area of the lower 16 bits (area of the 4th bit to the 19th bit). Furthermore, identification information "1000 0000" indicating that the MIDI signal inserted into the area of the lower 16 bits is the divided data of start is inserted into the area of the upper 8 bits (area of the 20th bit to the 27th bit).

FIG. 8(*e*) illustrates a state of the main data field of the 4th to 27th time slots in the second one of the sub-frames of the frame 1. Data of the respective fields of "r", "note number", and "attribute type" constituting the first divided data of continuation are inserted sequentially from the MSB side into the area of the lower 16 bits (area of the 4th bit to the 19th bit). Furthermore, identification information "0100 0000" indicating that the MIDI signal inserted into the area of the lower 16 bits is the divided data of continuation (continued) is inserted into the area of the upper 8 bits (area of the 20th bit to the 27th bit).

FIG. 8(*f*) illustrates a state of the main data field of the 4th to 27th time slots in the first one of the sub-frames of the frame 3. Data of the field of "velocity" constituting the second divided data of continuation is inserted sequentially from the MSB side into the area of the lower 16 bits (area of the 4th bit to the 19th bit). Furthermore, identification information "0100 0000" indicating that the MIDI signal inserted into the area of the lower 16 bits is the divided data of continuation (continued) is inserted into the area of the upper 8 bits (area of the 20th bit to the 27th bit).

FIG. 8(*g*) illustrates a state of the main data field of the 4th to 27th time slots in the second one of the sub-frames of the frame 3. Data of the field of "attribute" constituting the third divided data of continuation is inserted sequentially from the MSB side into the area of the lower 16 bits (area of the 4th bit to the 19th bit). Furthermore, identification information "0100 0000" indicating that the MIDI signal inserted into the area of the lower 16 bits is the divided data of continuation (continued) is inserted into the area of the upper 8 bits (area of the 20th bit to the 27th bit).

FIG. 8(*h*) illustrates a state of the main data field of the 4th to 27th time slots in the first one of the sub-frames of a frame 5. The area of the lower 16 bits (area of the 4th to 19th bit) is not used for insertion of the MIDI signal. Furthermore, identification information "0000 0000" indicating the idling state in which no MIDI signal is present in the area of the lower 16 bits is inserted into the area of the upper 8 bits (area of the 20th bit to the 27th bit).

Note that, although not described in detail, packets of other MIDI 2.0 messages (universal MIDI packets) are similarly divided into sub-frames (second sub-frames) into which MIDI signals are to be inserted, and inserted.

FIG. 9 schematically illustrates a format of a channel status in a case where the linear PCM signal and the MIDI signal are simultaneously transmitted as described above. The channel status is obtained by accumulating the 30th time slot in the sub-frame for each block, as described above. The entire channel status includes the 0th to 23rd bytes.

The 0th bit a="0" indicates that the channel status is for consumer use. Furthermore, the first bit b="0" indicates use in transmission for linear PCM. Furthermore, for three bits from the third bit to the fifth bit, for example, "001" is set, which indicates use in transmission for multichannel linear PCM.

Four bits from the 49th bit to the 52nd bit are a field indicating "Multichannel Configuration Type". The four bits are set to "1110", for example, to be identification information indicating simultaneous transmission of the MIDI signal of MIDI 2.0 and the linear PCM signal. Furthermore, when the four bits are "1110", the following eight bits from the 53rd bit to the 60th bit are valid. The eight bits are a field indicating a "configuration value". The eight bits are set to "10000000", for example, to indicate simultaneous transmission of the stereo 2-channel audio signal and the MIDI signal of MIDI 2.0.

"Transmission of MIDI Signal of MIDI 1.0"

In the above description, an example has been described in which the linear PCM signal and the MIDI signal of MIDI 2.0 are simultaneously transmitted. Similarly, it is also conceivable to simultaneously transmit the linear PCM signal and a MIDI signal of MIDI 1.0.

FIG. 10(*a*) is a diagram for explaining a "bitstream method" as a method of inserting the MIDI signal of MIDI 1.0. In this method, the main data field of the 4th to 27th time slots of a sub-frame (second sub-frame) in which the MIDI signal is to be transmitted is divided into an area of upper 8 bits (one byte) and an area of lower 16 bits (two bytes). Fixed data, for example, "00000000" is inserted into the area of the upper 8 bits.

The MIDI signal of MIDI 1.0 is inserted into the area of the lower 16 bits "MIDI 1.0 data payload" in bit order. In this case, packet data constituting the MIDI signal is inserted from an arbitrary bit position in the area of the lower 16 bits of a certain sub-frame (second sub-frame), and in a case where all the packet data cannot be inserted, remaining packet data is inserted from the first bit position (4th bit) in the area of the lower 16 bits of the next sub-frame (second sub-frame). On the reception side, bitstreams of the signal are connected together across the sub-frames, and the MIDI signal of MIDI 1.0 is detected.

The MIDI signal of MIDI 1.0 logically has 8 bits, but is transmitted in a total of 10 bits by adding one start bit (logic 0) and one stop bit (logic 1). As described above, the 10-bit data is inserted from an arbitrary bit position in the area of the lower 16 bits "MIDI 1.0 data payload" of the sub-frame (second sub-frame). To each bit position in an area before the arbitrary bit position, data of logic 1 is inserted to indicate an idling state in which no data exists.

In the "bitstream method", the packet data can be inserted into the area of the lower 16 bits "MIDI 1.0 data payload" of the sub-frame (second sub-frame) in which the MIDI signal is to be transmitted, in accordance with a generation timing of the MIDI signal. However, in this case, processing on the reception side is on a bit-by-bit basis, and the processing may be complicated.

FIG. 10(*b*) is a diagram for explaining a "byte alignment method" as a method of inserting the MIDI signal of MIDI 1.0. In this method, the main data field of the 4th to 27th time slots of a sub-frame (second sub-frame) in which the MIDI signal is to be transmitted is divided into an area of upper 8 bits (one byte), an area of middle 8 bits (one byte), and an area of lower 8 bits (one byte). Fixed data, for example, "00000000" is inserted into the area of the upper 8 bits and the area of the lower 8 bits.

The MIDI signal of MIDI 1.0 is fixedly inserted into the area of the middle 8 bits. In this case, one start bit (logic 0) and one stop bit (logic 1) are not added. Note that, it is also conceivable that the MIDI signal of MIDI 1.0 is inserted not in the area of the middle 8 bits but in the area of the lower 8 bits.

In the case of the MIDI signal of MIDI 1.0, since valid data is processed for each byte, the processing on the reception side can be easily simplified in a case where a byte position of the MIDI signal is fixed as described above. In this case, an idling state in which no MIDI signal of MIDI 1.0 is inserted can be indicated by a V (Validity flag) bit. Furthermore, instead of inserting the MIDI signal of MIDI 1.0, an end-of-exclusive (EOX) message or a special message may be newly provided and inserted to indicate the idling state in which no MIDI signal of MIDI 1.0 is inserted.

FIG. 11(a) is a diagram for explaining a "data extension method" as a method of inserting the MIDI signal of MIDI 1.0. In this method, the main data field of the 4th to 27th time slots of a sub-frame (second sub-frame) in which the MIDI signal is to be transmitted is divided into an area of upper 8 bits (one byte), an area of middle 8 bits (one byte), and an area of lower 8 bits (one byte). Fixed data, for example, "00000000" is inserted into the area of the upper 8 bits.

The MIDI signal of MIDI 1.0 is fixedly inserted into the area of the middle 8 bits. Furthermore, the area of the lower 8 bits is used as an extended byte (Extended Byte). Using the extended byte enables unique extension, for example, high resolution of velocity, an increase in the number of channels, and the like. For example, regarding the increase in the number of channels, the extended byte can be used to indicate a sub-channel. That is, in the case of MIDI 1.0, the number of channels that can be identified by the channels included in the MIDI signal is 16; however, by using the extended byte to identify the sub-channels of each channel, the number of channels can be specified more finely. In this case, channel designation is performed such as "the mth sub-channel of the nth channel".

Even in the case of the "data extension method", it is possible to indicate the idling state in which no MIDI signal of MIDI 1.0 is inserted, similarly to the "byte alignment method" described above. Note that, it is also conceivable to invert the area of the 8 bits into which the MIDI signal of MIDI 1.0 is inserted and the area of the 8 bits of the extended byte.

Note that, in the byte of the MIDI signal of MIDI 1.0, its MSB is used to identify a status byte (Status Byte) and a data byte (Data Byte), so that the resolution is practically seven bits. For that reason, in FIG. 11(a), the data length is illustrated as a total of 15 bits including 7 bits of the MIDI signal and 8 bits of the extension.

However, in consideration of compatibility with MIDI 1.0, it is also conceivable to set the valid data length for the extension to seven bits. In this case, the data length is a total of 14 bits including 7 bits of the MIDI signal and 7 bits of the extension. FIGS. 11(b) and 11(c) illustrate that case. FIG. 11(b) illustrates a case where the byte of the MIDI signal is a status byte, and FIG. 11(c) illustrates a case where the byte of the MIDI signal is a data byte. By setting the valid data length of the extension to seven bits as described above, for example, it is expected that processing by software is easy.

Note that, in a case where a plurality of the above-described "bitstream method", "byte alignment method", and "data extension method" is operated as the method of inserting the MIDI signal of MIDI 1.0, it is possible to identify the methods by, for example, the "configuration value" in the area from the 53rd bit to the 60th bit of the above-described channel status (see FIG. 9).

Furthermore, in a case where the MIDI signal of MIDI 1.0 is inserted into the sub-frame (second sub-frame) by each of the above-described methods, the upper 8 bits of the 24 bit area of the main data field are "00000000". For that reason, even if the 24-bit data is erroneously reproduced as audio data, the volume is low, and damage to the audio amplifier and the speaker can be avoided.

"MIDI Signals of a Plurality of Channels"

Note that, the channel of the MIDI signal to be transmitted simultaneously with the linear PCM signal is not limited to one channel, and can be a plurality of channels. Such a plurality of MIDI signal channels corresponds to a plurality of virtual MIDI cables. For example, although the number of channels in one channel of MIDI 1.0 is 16, the number of channels can be increased by providing a plurality of channels.

Figure 12:
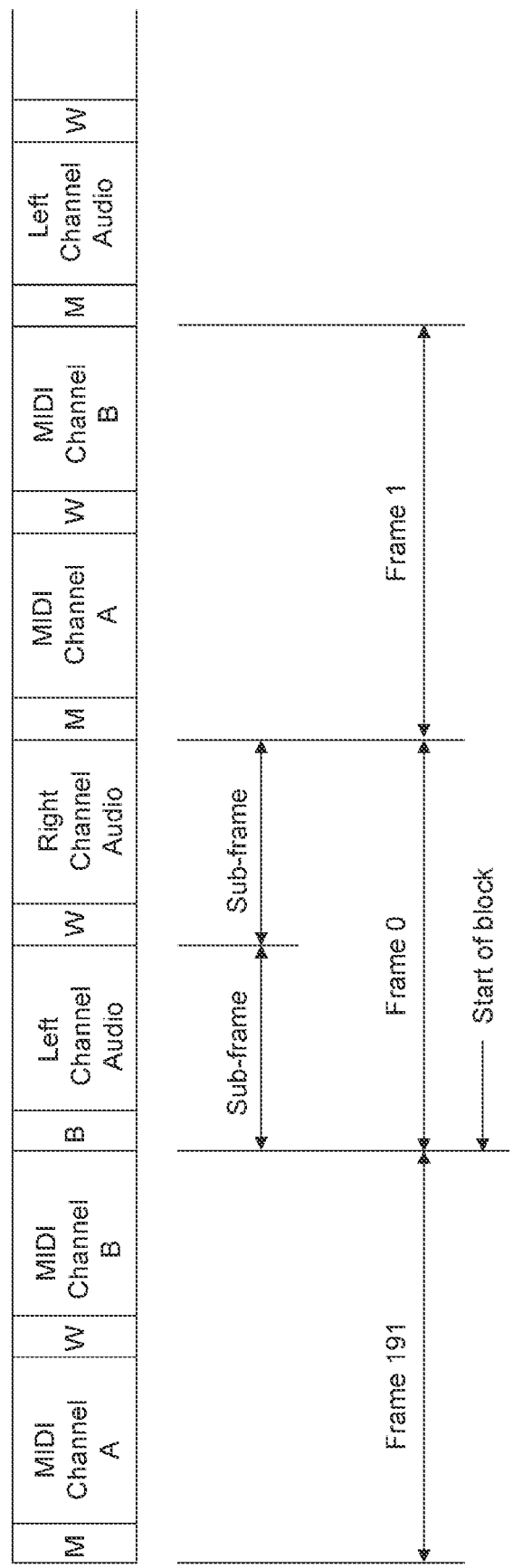
FIG. 12 is a diagram for explaining a case where there is a plurality of channels of the MIDI signal to be transmitted simultaneously with the linear PCM signal.

FIG. 12 illustrates an example of a frame configuration of the SPDIF signal in that case. This example indicates a case where the MIDI signal to be transmitted simultaneously with the linear PCM signal has two channels of A and B.

In this case, in the even-numbered frame, the left-channel audio signal is included in the first one of the sub-frames (first sub-frames), and the right-channel audio signal is included in the second one of the sub-frames (first sub-frames). Furthermore, in the odd-numbered frame, the first one of the sub-frames (second sub-frames) includes the MIDI signal of the channel A, and the second one of the sub-frames (second sub-frames) includes the MIDI signal of the channel B.

Note that, also in a case where a plurality of MIDI signal channels is provided, it is possible to identify the methods by, for example, the "configuration value" in the area from the 53rd bit to the 60th bit of the above-described channel status (see FIG. 9).

As described above, in the transmission/reception system 10 illustrated in FIG. 1, the signal of the sub-frame (first sub-frame) including the audio signal (linear PCM signal) and the signal of the sub-frame (second sub-frame) including the MIDI signal are included in the signals (SPDIF signal) consecutive in the sub-frame units transmitted from the transmission device 101 to the reception device 102. For that reason, simultaneous transmission of the audio signal and the MIDI signal can be stably performed without delay.

Note that, since the linear PCM signal and the MIDI signal are asynchronous with each other, jitter occurs when the MIDI signal is placed on the transmission path at a sampling timing of the linear PCM signal. The jitter can be ignored if it is within an acceptable range, but it is also conceivable to suppress the jitter, for example, by a jitter suppression system using a time stamp.

For example, in a case where a transmission speed of an original MIDI 1.0 is 31.25 kbps and a sampling frequency of the linear PCM signal is 48 kHz, the MIDI signal accumulated in a buffer of the SPDIF transmission circuit 110 at a timing of 31.25 kbps is transmitted to the transmission path at a timing of 48 kHz, and jitter occurs. For example, in a case where the MIDI signal is generated at 48 kHz, jitter does not occur.

Furthermore, in the above description, an example has been described in which the audio signal to be transmitted simultaneously with the MIDI signal is a linear PCM signal. A case is also conceivable in which the audio signal to be transmitted simultaneously with the MIDI signal is not a linear PCM signal but a compressed audio signal. In that case, instead of the interface format of IEC 609581 that handles the linear PCM signal described above, the IEC 61937-1 interface format that handles the compressed audio signal is used.

Figure 13:
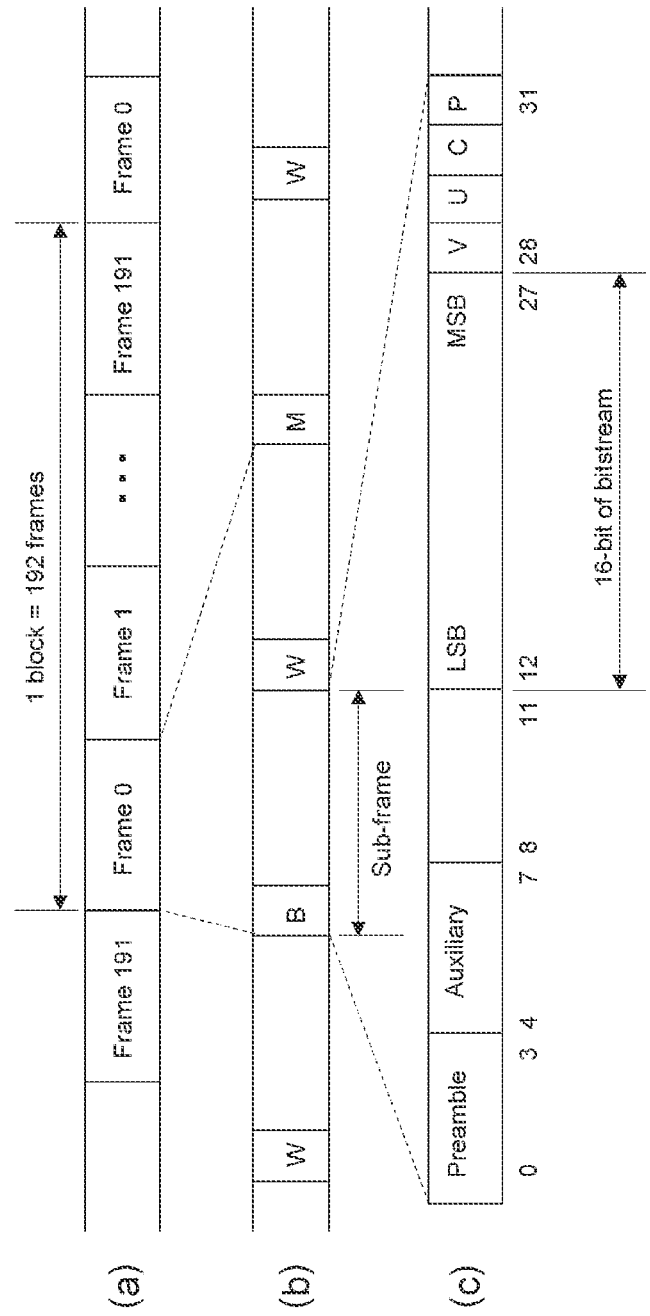
FIG. 13 is a diagram illustrating an IEC 61937-1 interface format.

FIG. 13 illustrates an IEC 61937-1 interface format. FIG. 13(a) illustrates a frame configuration. One block is constituted by 192 frames, and a plurality of the blocks is consecutively included. FIG. 13(b) illustrates that each frame includes two sub-frames.

A preamble is provided at the head of the sub-frame, and "B" representing the start of the block is given to the preamble of the sub-frame at the head of the block. Then, "W" and "M" are alternately given to the preambles at the heads of respective subsequent sub-frames.

FIG. 13(c) illustrates a sub-frame configuration. In the case of the SPDIF signal including a predetermined number of channels of the compressed audio signals, bitstreams of the compressed audio signals are divided and sequentially inserted into the 12th to 27th time slots of respective sub-frames. That is, the upper 16 bits of the 24-bit audio data area of the 4th to 27th time slots of each sub-frame are used for transmission of the compressed audio signal.

"Transmission of Only MIDI Signal"

Furthermore, in the above description, an example has been described in which the audio signal and the MIDI signal are transmitted simultaneously; however, it is conceivable to transmit only the MIDI signal. In this case, it is possible to use the IEC 61937-1 interface format that handles the compressed audio signal described above, for example.

In this case, the MIDI signal is inserted into the sub-frame into which the MIDI signal is to be inserted, and transmitted. A configuration of the sub-frame in the case of transmitting the MIDI signal of MIDI 2.0 can have a configuration as illustrated in FIG. 7 described above, for example. Furthermore, in the case of transmitting the MIDI signal of MIDI 1.0, the MIDI signal can be inserted by, for example, any of the above-described "bitstream method", "byte alignment method", and "data extension method" (see FIGS. 10 and 11).

Furthermore, even in a case where only the MIDI signal is transmitted as described above, the channel of the MIDI signal is not limited to one channel, and a plurality of channels can be used.

Figure 14:
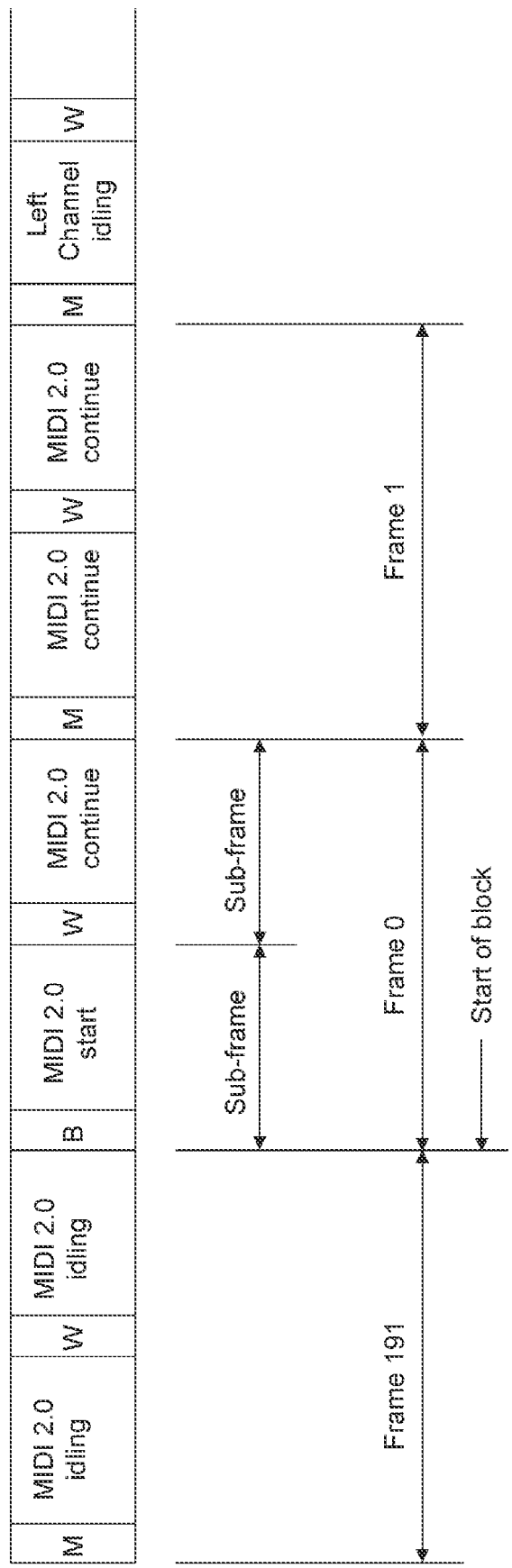
FIG. 14 is a diagram illustrating an example of a frame configuration of an SPDIF signal in a case where only a MIDI signal is transmitted.

FIG. 14 illustrates an example of a frame configuration of the SPDIF signal in the case where only the MIDI signal is transmitted. This example illustrates a case where one 64-bit data packet of MIDI 2.0, for example, one note on message (see FIG. 3) is transmitted. In this case, the packet data is divided into four pieces of 16 bits each, inserted into four consecutive sub-frames, and transmitted. In the illustrated example, the divided data are inserted into respective four sub-frames of frames 1 and 2.

FIG. 15 schematically illustrates a format of a channel status in the case where only the MIDI signal is transmitted as described above. The channel status is obtained by accumulating the 30th time slot in the sub-frame for each block, as described above. The entire channel status includes the 0th to 23rd bytes.

The 0th bit a="0" indicates that the channel status is for consumer use. Furthermore, the first bit b="1" indicates use in transmission of a compressed digital audio signal.

Four bits from the 49th bit to the 52nd bit are a field indicating "Multichannel Configuration Type". The four bits are set to "1110", for example, to be identification information indicating transmission of the MIDI signal. Furthermore, when the four bits are "1110", the following eight bits from the 53rd bit to the 60th bit are valid. The eight bits are a field indicating a "configuration value".

Here, "0000000" indicates transmission of the MIDI signal of MIDI 2.0. Furthermore, "01000000" indicates transmission of the MIDI signal of MIDI 1.0 according to the "bitstream method" (see FIG. 10(a)). Furthermore, "11000000" indicates transmission of the MIDI signal of MIDI 1.0 according to the "byte alignment method" (see FIG. 10(b)). Furthermore, "00100000" indicates transmission of the MIDI signal of MIDI 1.0 according to the "data extension method" (see FIG. 11(a)). Furthermore, "10100000" indicates transmission of the MIDI signal of two channels A and B.

Note that, in the above description, it has been described that the IEC 61937-1 interface format that handles the compressed audio signals can be used in the case where only the MIDI signal is transmitted. Although detailed description is omitted, it is also conceivable to use the interface format of IEC 609581 that handles the linear PCM signal described above.

"Capability Inquiry (MIDI CI)"

MIDI CI is bidirectional communication with a mechanism in which devices perform negotiation with each other in advance, and a transfer rate change (Protocol) within a range in which the devices can cope with, transmission and reception (Profile) in a new message system, a tone library information exchange (Property) between connected devices, or the like can be performed.

The transmission path in which the SPDIF or its protocol is mapped is bidirectionally connected, whereby the MIDI CI is enabled. Alternatively, in a case where there are bidirectional communication paths such as Ethernet and HDMI CEC in parallel with the interface, a function of the MIDI CI can also be implemented by using these.

Switching between protocols of MIDI 1.0 and MIDI 2.0, and support confirmation and switching of an extended protocol using MIDI 1.0 can also be performed by extending the specification of the MIDI CI. Of course, manual setting by the user is also permitted.

2. Second Embodiment

[Configuration Example of Acoustic System]

Figure 16:
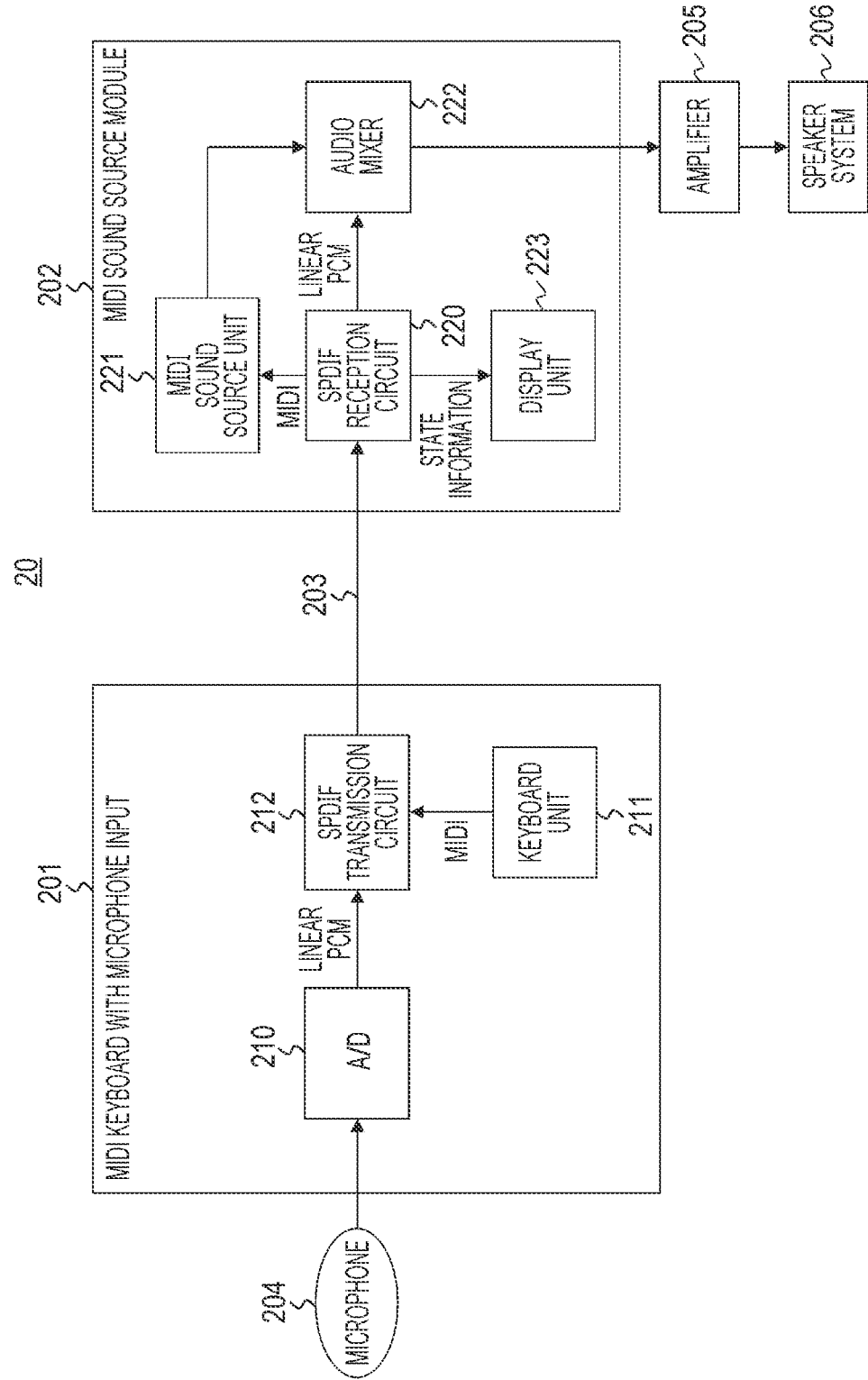
FIG. 16 is a block diagram illustrating a configuration example of an acoustic system as a second embodiment.

FIG. 16 illustrates a configuration example of an acoustic system 20 as a second embodiment. The acoustic system 20 includes a MIDI keyboard with microphone input 201 and a MIDI sound source module 202. The MIDI keyboard with microphone input 201 and the MIDI sound source module 202 are connected to each other via a transmission path 203 including a coaxial cable, an optical cable, or the like. The transmission path 203 constitutes an IEC 60958 transmission path.

The MIDI keyboard with microphone input 201 includes an A/D converter 210, a keyboard unit 211, and an SPDIF transmission circuit 212. The A/D converter 210 converts an analog audio signal obtained by collecting sound by a microphone 204 into a linear PCM signal and transmits the linear PCM signal to the SPDIF transmission circuit 212. The keyboard unit 211 includes a MIDI detector (not illustrated), generates a MIDI signal (MIDI signal of MIDI 2.0 or MIDI 1.0) with a performance, and transmits the MIDI signal to the SPDIF transmission circuit 212.

Similarly to the SPDIF transmission circuit 110 in the transmission device 101 of the transmission/reception system 10 described above, the SPDIF transmission circuit 212 is a circuit for transmitting an SPDIF signal (IEC 60958 standard digital audio transmission signal), and is a transmission circuit conforming to the IEC 60958 standard.

Similarly to the SPDIF transmission circuit 110, the SPDIF transmission circuit 212 generates an SPDIF signal simultaneously including the linear PCM signal from the A/D converter 210 and the MIDI signal from the keyboard unit 211, and transmits the SPDIF signal to the MIDI sound source module 202 through the transmission path 203.

The MIDI sound source module 202 includes an SPDIF reception circuit 220, a MIDI sound source unit 221, an audio mixer 222, and a display unit 223. Similarly to the SPDIF reception circuit 120 in the reception device 102 of the transmission/reception system 10 described above, the SPDIF reception circuit 220 is a circuit for receiving an SPDIF signal and is a reception circuit conforming to the IEC 60958 standard.

The SPDIF reception circuit 220 receives the SPDIF signal transmitted from the MIDI keyboard with microphone input 201 through the transmission path 203, and extracts and outputs the linear PCM signal and the MIDI signal included in the SPDIF signal. Furthermore, the SPDIF reception circuit 220 outputs state information indicating whether or not there is a MIDI signal. This state information is transmitted to the display unit 223, and whether or not there is a MIDI signal is displayed on the display unit 223.

The MIDI sound source unit 221 receives the MIDI signal output from the SPDIF reception circuit 220, converts the MIDI signal into music data by the MIDI sound source, and outputs a linear PCM signal corresponding to the music data. The audio mixer 222 synthesizes the linear PCM signal output from the SPDIF reception circuit 220 and the linear PCM signal output from the MIDI sound source unit 221, and outputs a synthesized linear PCM signal.

The linear PCM signal synthesized as described above is transmitted to a speaker system 206 through an amplifier 205. As a result, an acoustic output based on the linear PCM signal is obtained from the speaker system 206.

In the acoustic system 20, in a case where the keyboard unit 211 is a keyboard unit of a piano and the microphone 204 collects performance sound of the piano, in the MIDI sound source module 202, a linear PCM signal of the sound of strings accompanying a piano performance is output from the MIDI sound source unit 221, and the sound obtained by synthesizing the sound of the strings and the sound of the piano can be reproduced. Furthermore, in the acoustic system 20, in a case where the microphone 204 collects a singing voice synchronized with accompaniment performed by the keyboard unit 211, the MIDI sound source module 202 can reproduce the sound obtained by synthesizing the accompaniment sound and the singing voice.

As described above, in the acoustic system 20 illustrated in FIG. 16, the SPDIF signal (signals consecutive in sub-frame units) transmitted from the MIDI keyboard with microphone input 201 to the MIDI sound source module 202 includes the linear PCM signal and the MIDI signal. As a result, simultaneous transmission of the linear PCM signal (audio signal) and the MIDI signal can be stably performed without delay, and generation and reproduction of the synthesized sound can be satisfactorily performed.

3. Third Embodiment

[Configuration Example of Television System]

Figure 17:
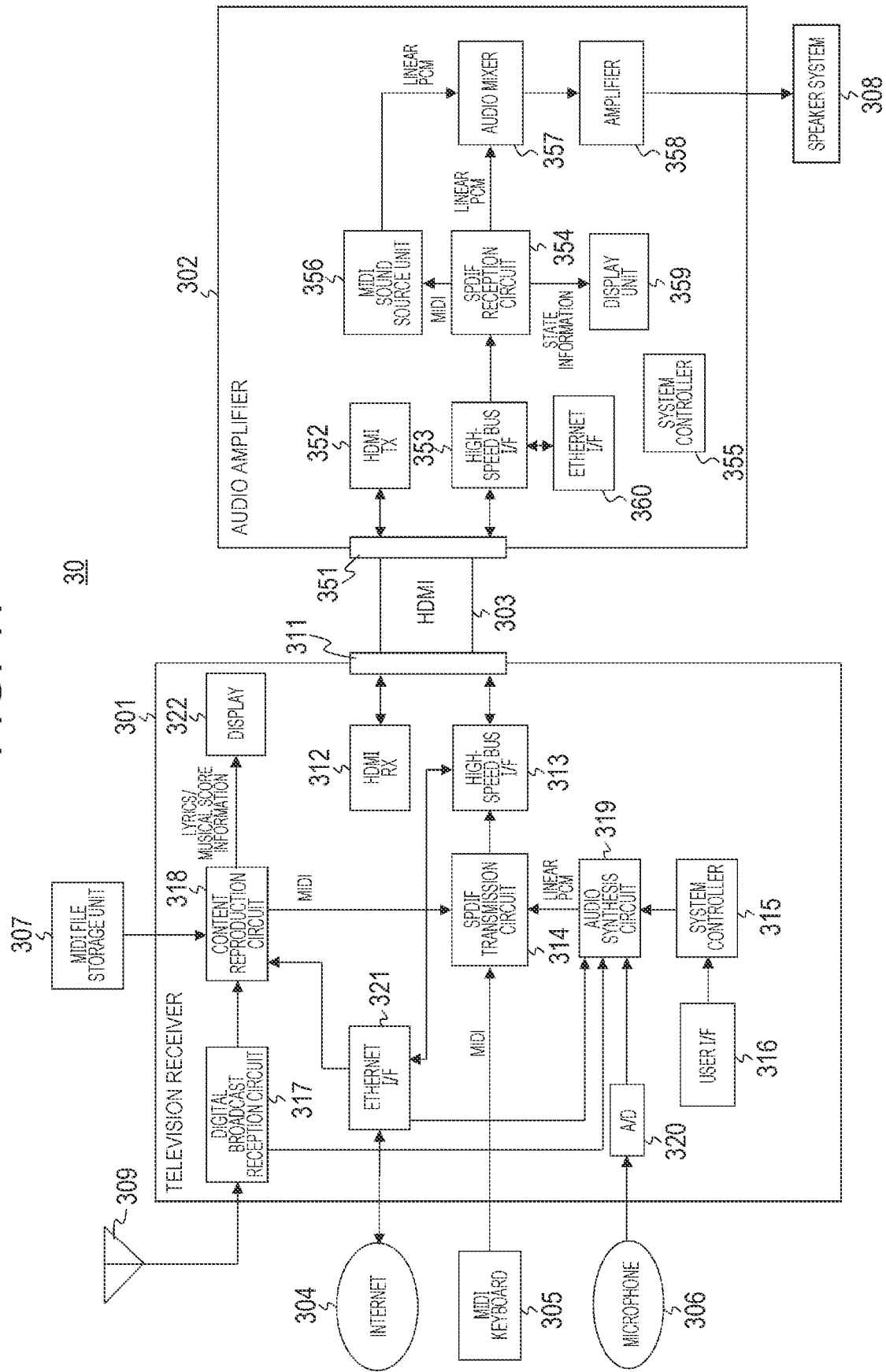
FIG. 17 is a block diagram illustrating a configuration example of an AV system as a third embodiment.

FIG. 17 illustrates a configuration example of an AV system 30 as a third embodiment. The AV system 30 includes a television receiver 301 and an audio amplifier 302.

A reception antenna 309 for television broadcasting, a MIDI file storage unit 307, the Internet 304, a MIDI keyboard 305, and a microphone 306 are connected to the television receiver 301. Furthermore, a speaker system 308 is connected to the audio amplifier 302.

The television receiver 301 and the audio amplifier 302 are connected to each other via an HDMI cable 303. Note that, "HDMI" is a registered trademark. The television receiver 301 is provided with an HDMI terminal 311 to which an HDMI reception unit (HDMI RX) 312 and a high-speed bus interface 313 constituting a communication unit are connected. The audio amplifier 302 is provided with an HDMI terminal 351 to which an HDMI transmission unit (HDMI TX) 352 and a high-speed bus interface 353 constituting a communication unit are connected. One end of the HDMI cable 303 is connected to the HDMI terminal 311 of the television receiver 301, and the other end thereof is connected to the HDMI terminal 351 of the audio amplifier 302.

[Configuration of Television Receiver]

The television receiver 301 includes the HDMI reception unit 312, the high-speed bus interface 313, and an SPDIF transmission circuit 314. Furthermore, the television receiver 301 includes a system controller 315, a user interface 316, a digital broadcast reception circuit 317, a content reproduction circuit 318, an audio synthesis circuit 319, an A/D converter 320, an Ethernet interface 321, and a display 322. Note that, "Ethernet" and "Ethernet" are registered trademarks. Furthermore, in the illustrated example, to simplify the description, each part of an image system is appropriately omitted.

The system controller 315 controls operation of each unit of the television receiver 301. The user interface 316 is connected to the system controller 315. The user interface 316 constitutes an operation unit for the user to perform various operations, and includes, for example, a remote controller, a touch panel, a mouse, a keyboard, a gesture input unit that detects an instruction input with a camera, a voice input unit for performing instruction input by voice, and the like.

The digital broadcast reception circuit 317 processes a television broadcast signal input from the reception antenna 309 to obtain a video signal and a linear PCM signal of a broadcast content, and further obtain a MIDI file. The Ethernet interface 321 communicates with an external server via the Internet 304. The Ethernet interface 321 acquires a network content from the external server, and obtains a video signal and a linear PCM signal, and further a MIDI file of the network content.

The MIDI file storage unit 307 includes, for example, a removable memory such as a USB memory, and stores a MIDI file. The MIDI file storage unit 307 can also store a MIDI file obtained in advance by the Ethernet interface 321 or the digital broadcast reception circuit 317, for example.

The content reproduction circuit 318 outputs a MIDI signal on the basis of the MIDI file obtained by the digital broadcast reception circuit 317 or the Ethernet interface 321 or the MIDI file read from the MIDI file storage unit 307. Furthermore, the content reproduction circuit 318 extracts information of lyrics and a musical score from the MIDI file and transmits the information to the display 322. As a result, the lyrics and musical score are displayed on the display 322.

The A/D converter 320 converts an analog audio signal obtained by collecting sound by the microphone 306 into a linear PCM signal. The audio synthesis circuit 319 receives the linear PCM signal obtained by the digital broadcast reception circuit 317, the linear PCM signal obtained by the Ethernet interface 321, and further the linear PCM signal obtained by the A/D converter 320, and selectively synthesizes and outputs the signals. The selection and synthesis in the audio synthesis circuit 319 is controlled by the system controller 315 in accordance with the user's operation.

The HDMI reception unit 312 receives image and audio data supplied to the HDMI terminal 311 through the HDMI cable 303 by communication conforming to HDMI. The high-speed bus interface 313 is an interface of a bidirectional communication path configured using a reserve line and a hot plug detect (HPD) line constituting the HDMI cable 303. Note that, details of the HDMI reception unit 312 and the high-speed bus interface 313 will be described later.

Similarly to the SPDIF transmission circuit 110 in the transmission device 101 of the transmission/reception system 10 described above, the SPDIF transmission circuit 314 is a circuit for transmitting an SPDIF signal (IEC 60958 standard digital audio transmission signal), and is a transmission circuit conforming to the IEC 60958 standard.

Similarly to the SPDIF transmission circuit 110, the SPDIF transmission circuit 314 generates an SPDIF signal simultaneously including the linear PCM signal and the MIDI signal, and transmits the SPDIF signal to the audio amplifier 302 through the high-speed bus interface 313. Here, the linear PCM signal included in the SPDIF signal is the linear PCM signal output from the audio synthesis circuit 319. Furthermore, the MIDI signal included in the SPDIF signal is a MIDI signal obtained by synthesizing the MIDI signal output from the content reproduction circuit 318 and the MIDI signal output from the MIDI keyboard 305.

"Configuration of Audio Amplifier"

The audio amplifier 302 includes the HDMI transmission unit 352, the high-speed bus interface 353, and an SPDIF reception circuit 354. Furthermore, the audio amplifier 302 includes a system controller 355, a MIDI sound source unit 356, an audio mixer 357, an amplifier 358, a display unit 359, and an Ethernet interface 360.

The system controller 355 controls operation of each unit of the audio amplifier 302. The HDMI transmission unit 352 transmits image and audio data from the HDMI terminal 351 to the HDMI cable 303 by communication conforming to HDMI. The high-speed bus interface 353 is an interface of a bidirectional communication path configured using a reserve line and a hot plug detect (HPD) line constituting the HDMI cable 303. The Ethernet interface 360 communicates with an external server via the Internet. Note that, details of the HDMI transmission unit 352 and the high-speed bus interface 353 will be described later.

Similarly to the SPDIF reception circuit 120 in the reception device 102 of the transmission/reception system 10 described above, the SPDIF reception circuit 354 is a circuit for receiving an SPDIF signal and is a reception circuit conforming to the IEC 60958 standard.

The SPDIF reception circuit 354 receives the SPDIF signal from the television receiver 301 through the high-speed bus interface 353, and extracts and outputs the linear PCM signal and the MIDI signal included in the SPDIF signal. Furthermore, the SPDIF reception circuit 354 outputs state information indicating whether or not there is a MIDI signal. This state information is transmitted to the display unit 359, and whether or not there is a MIDI signal is displayed on the display unit 359.

The MIDI sound source unit 356 receives the MIDI signal output from the SPDIF reception circuit 354, converts the MIDI signal into music data by the MIDI sound source, and outputs a linear PCM signal corresponding to the music data.

The audio mixer 357 synthesizes the linear PCM signal output from the SPDIF reception circuit 354 and the linear PCM signal output from the MIDI sound source unit 356, and outputs a synthesized linear PCM signal.

The amplifier 358 amplifies the linear-A PCM signal obtained by the audio mixer 357 and supplies the amplified signal to the speaker system 308. As a result, an acoustic output based on the linear PCM signal is obtained from the speaker system 308.

"Configuration Example of HDMI Transmission Unit/Reception Unit"

Figure 18:
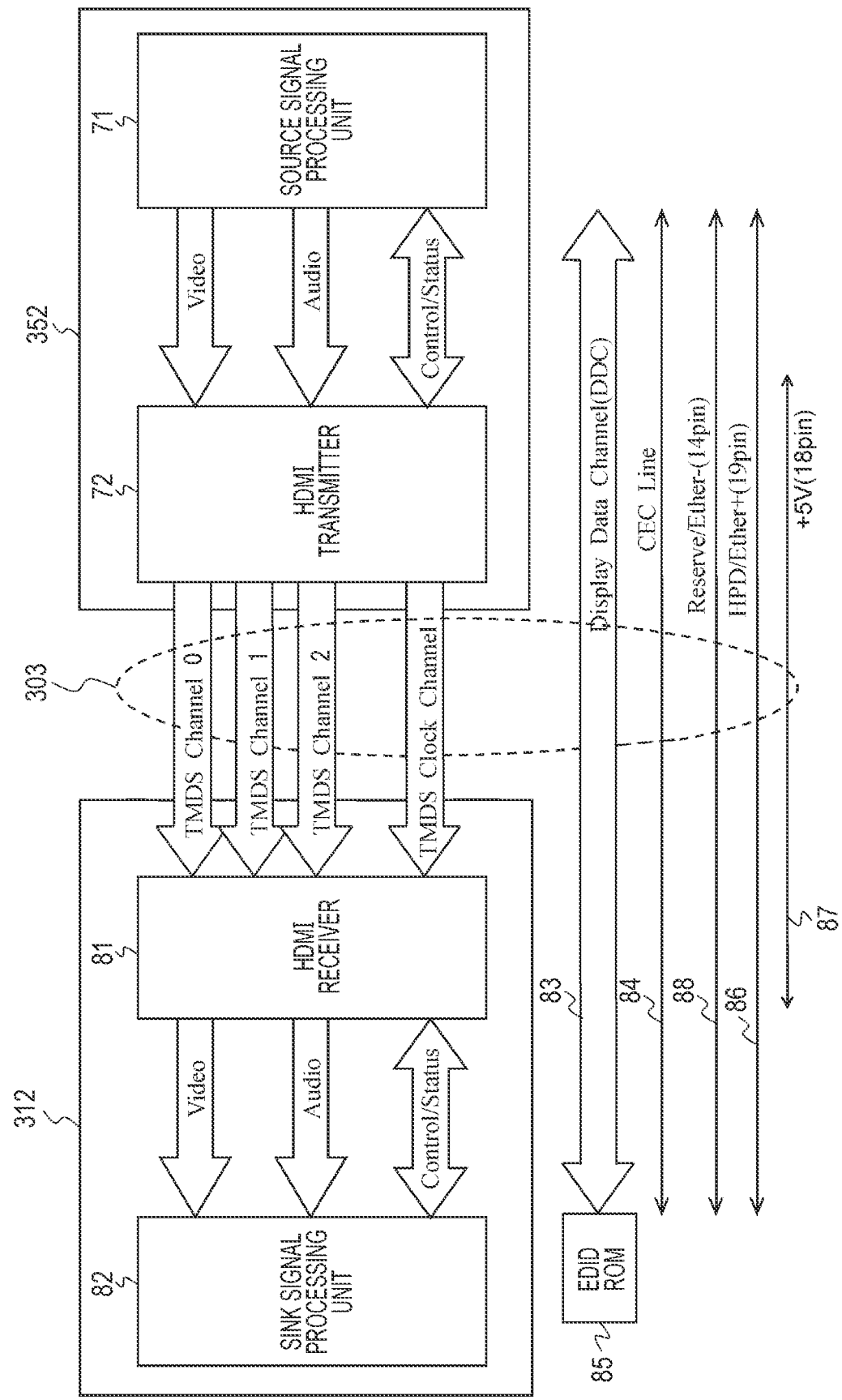
FIG. 18 is a block diagram illustrating configuration examples of an HDMI reception unit of a television receiver and an HDMI transmission unit of an audio amplifier.

FIG. 18 illustrates a configuration example of the HDMI reception unit 312 of the television receiver 301 and the HDMI transmission unit 352 of the audio amplifier 302 in the AV system 30 of FIG. 17.

The HDMI transmission unit 352 transmits a baseband (uncompressed) differential signal of image data for one screen to the HDMI reception unit 312 in one direction through a plurality of channels, in a valid image interval (hereinafter, referred to as an "active video interval" as appropriate) that is an interval obtained by removing a horizontal blanking period and a vertical blanking period from an interval (hereinafter, referred to as a "video field" as appropriate) from a certain vertical synchronization signal to a next vertical synchronization signal. Furthermore, in the horizontal blanking period and the vertical blanking period, the HDMI transmission unit 352 transmits differential signals corresponding to audio data, a control packet (Control Packet), other auxiliary data, and the like accompanying image data, to the HDMI reception unit 312 in one direction through a plurality of channels.

The HDMI transmission unit 352 includes a source signal processing unit 71 and an HDMI transmitter 72. Baseband uncompressed image (Video) and audio (Audio) data is supplied to the source signal processing unit 71. The source signal processing unit 71 performs necessary processing on the supplied image and audio data, and supplies the processed data to the HDMI transmitter 72. Furthermore, the source signal processing unit 71 exchanges control information, information for notification of a status (Control/Status), and the like with the HDMI transmitter 72 as necessary.

The HDMI transmitter 72 converts the image data supplied from the source signal processing unit 71 into a corresponding differential signal, and transmits the differential signal in one direction to the HDMI reception unit 312 connected via the HDMI cable 303 through three TMDS channels #0, #1, and #2 that are a plurality of channels.

Moreover, the audio data, control packet, and other auxiliary data accompanying uncompressed image data supplied from the transmitter 72 and the source signal processing unit 71, and control data such as a vertical synchronization signal (VSYNC) and a horizontal synchronization signal (HSYNC) are converted into corresponding differential signals, and are transmitted in one direction to the HDMI reception unit 312 connected via the HDMI cable 303 through the three TMDS channels #0, #1, and #2.

Furthermore, the transmitter 72 transmits a pixel clock synchronized with the image data transmitted through the three TMDS channels #0, #1, and #2 to the HDMI reception unit 312 connected via the HDMI cable 303 through a TMDS clock channel.

The HDMI reception unit 312 receives the differential signal corresponding to the image data transmitted in one direction from the HDMI transmission unit 352 through a plurality of channels in the active video interval, and receives the differential signals corresponding to the auxiliary data and the control data transmitted from the HDMI transmission unit 352 through a plurality of channels in the horizontal blanking period and the vertical blanking period.

The HDMI reception unit 312 includes an HDMI receiver 81 and a sink signal processing unit 82. The HDMI receiver 81 receives, through the TMDS channels #0, #1, and #2, the differential signal corresponding to the image data and the differential signals corresponding to the auxiliary data and the control data transmitted in one direction from the HDMI transmission unit 352 connected via the HDMI cable 303 in synchronization with the pixel clock similarly transmitted from the HDMI transmission unit 352 through the TMDS clock channel. Moreover, the HDMI receiver 81 converts the differential signals into corresponding image data, auxiliary data, and control data, and supplies the data to the sink signal processing unit 82 as necessary.

The sink signal processing unit 82 performs necessary processing on the data supplied from the HDMI receiver 81 and outputs the data. In addition, the sink signal processing unit 82 exchanges control information, information for notification of a status (Control/Status), and the like with the HDMI receiver 81 as necessary.

In addition to the three TMDS channels #0, #1, and #2 for serially transmitting the image data, auxiliary data, and control data from the HDMI transmission unit 352 to the HDMI reception unit 312 in one direction in synchronization with the pixel clock, and the TMDS clock channel as a transmission channel for transmitting the pixel clock, HDMI transmission channels include a display data channel (DDC) 83, and further, a transmission channel called a CEC line 84.

The DDC 83 includes two lines (signal lines) (not illustrated) included in the HDMI cable 303, and is used by a source device to read enhanced-extended display identification (E-EDID) from a sink device connected via the HDMI cable 303. That is, the sink device includes an EDIDROM 85. The source device reads the E-EDID stored in the EDIDROM 85 from the sink device connected via the HDMI cable 303 via the DDC 83, and recognizes a setting and performance of the sink device on the basis of the E-EDID.

The CEC line 84 includes one line (not illustrated) included in the HDMI cable 303, and is used to perform bidirectional communication of control data between the source device and the sink device.

Furthermore, the HDMI cable 303 includes a line 86 connected to a pin called hot plug detect (HPD). The source device can detect connection of the sink device by using the line 86. Furthermore, the HDMI cable 303 includes a line 87 used to supply power from the source device to the sink device. Moreover, the HDMI cable 303 includes a reserve line 88.

"Configuration Example of High-Speed Bus Interface"

Figure 19:
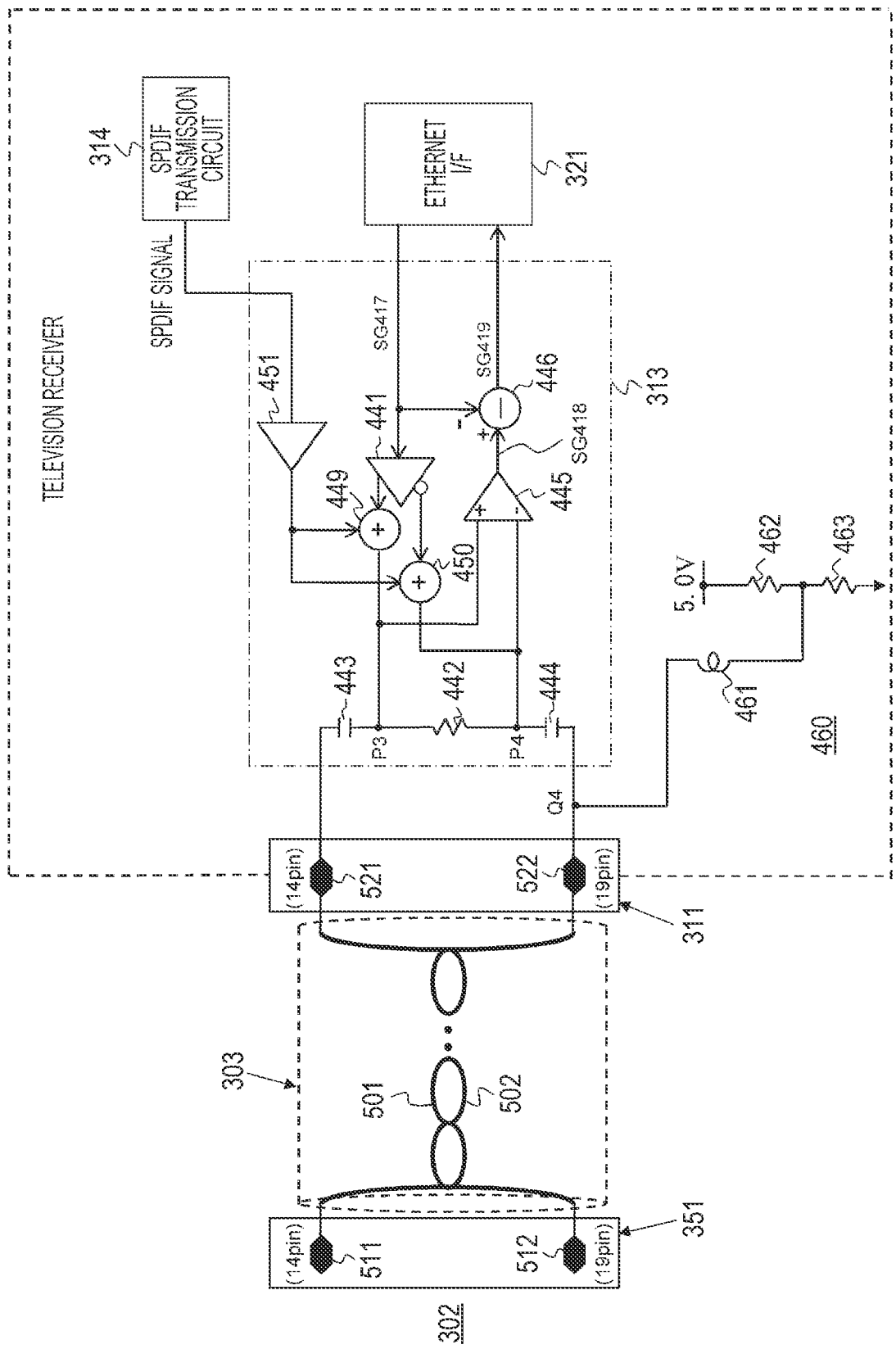
FIG. 19 is a diagram illustrating a configuration example of a high-speed bus interface of the television receiver.

FIG. 19 illustrates a configuration example of the high-speed bus interface 313 of the television receiver 301 in the AV system 30 of FIG. 17. The Ethernet interface 321 performs local area network (LAN) communication, that is, transmission and reception of an Ethernet signal, by using a transmission path including a pair of lines of the reserve line and the HPD line among a plurality of lines constituting the HDMI cable 303. The SPDIF transmission circuit 314 transmits the SPDIF signal by using the transmission path including the pair of lines described above.

The television receiver 301 includes a LAN signal transmission circuit 441, a termination resistor 442, AC coupling capacitors 443 and 444, a LAN signal reception circuit 445, a subtraction circuit 446, addition circuits 449 and 450, and an amplifier 451. These components constitute the high-speed bus interface 313. Furthermore, the television receiver 301 includes a choke coil 461, a resistor 462, and a resistor 463 that constitute a plug connection transmission circuit 460.

A series circuit of the AC coupling capacitor 443, the termination resistor 442, and the AC coupling capacitor 444 is connected between a 14 pin terminal 521 and a 19 pin terminal 522 of the HDMI terminal 311. Furthermore, a series circuit of the resistor 462 and the resistor 463 is connected between a power supply line (+5.0 V) and a ground line. Then, a connection point between the resistor 462 and the resistor 463 is connected to a connection point Q4 between the 19 pin terminal 522 and the AC coupling capacitor 444 via the choke coil 461.

A connection point P3 between the AC coupling capacitor 443 and the termination resistor 442 is connected to an output side of the addition circuit 449 and is connected to a positive input side of the LAN signal reception circuit 445. Furthermore, a connection point P4 between the AC coupling capacitor 444 and the termination resistor 442 is connected to an output side of the addition circuit 450 and is connected to a negative input side of the LAN signal reception circuit 445.

One input side of the addition circuit 449 is connected to a positive output side of the LAN signal transmission circuit 441, and the SPDIF signal output from the SPDIF transmission circuit 314 is supplied to another input side of the addition circuit 449 via the amplifier 451. Furthermore, one input side of the addition circuit 450 is connected to a negative output side of the LAN signal transmission circuit 441, and the SPDIF signal output from the SPDIF transmission circuit 314 is supplied to another input side of the addition circuit 450 via the amplifier 451.

A transmission signal (transmission data) SG417 is supplied from the Ethernet interface 321 to an input side of the LAN signal transmission circuit 441. Furthermore, an output signal SG418 of the LAN signal reception circuit 445 is supplied to a positive terminal of the subtraction circuit 446, and the transmission signal SG417 is supplied to a negative terminal of the subtraction circuit 446. In the subtraction circuit 446, the transmission signal SG417 is subtracted from the output signal SG418 of the LAN signal reception circuit 445, and a reception signal (reception data) SG419 is obtained. In a case where a LAN signal (Ethernet signal) is transmitted as a differential signal via the reserve line and the HPD line, the reception signal SG419 is the LAN signal. The reception signal SG419 is supplied to the Ethernet interface 321.

Figure 20:
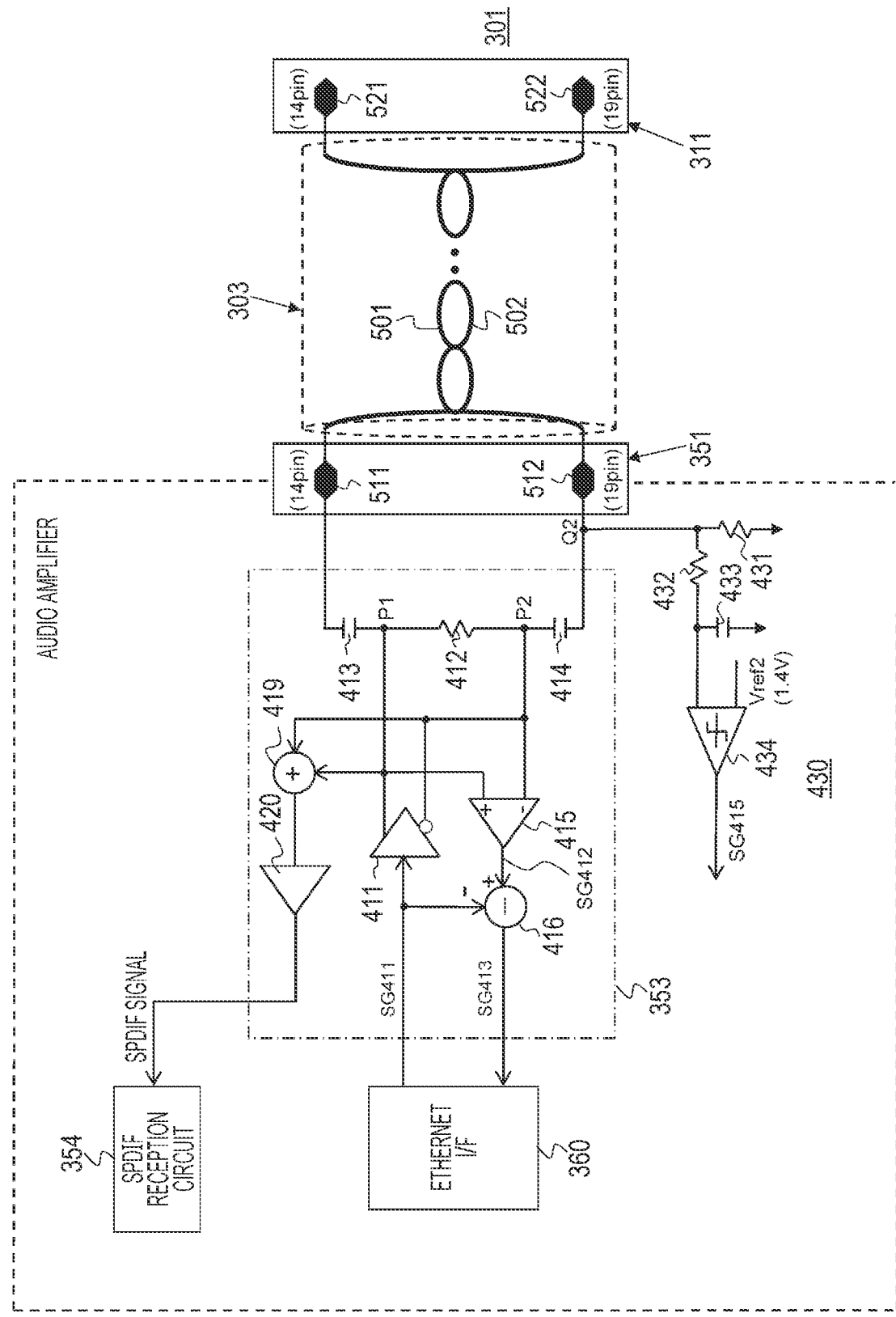
FIG. 20 is a diagram illustrating a configuration example of a high-speed bus interface of the audio amplifier.

FIG. 20 illustrates a configuration example of the high-speed bus interface 353 of the audio amplifier 302 in the AV system 30 of FIG. 17. The Ethernet interface 360 performs local area network (LAN) communication, that is, transmission and reception of an Ethernet signal, by using the transmission path including the pair of lines of the reserve line and the HPD line among the plurality of lines constituting the HDMI cable 303. The SPDIF reception circuit 354 receives the SPDIF signal by using the transmission path including the pair of lines described above.

The audio amplifier 302 includes a LAN signal transmission circuit 411, a termination resistor 412, an AC coupling capacitors 413 and 414, a LAN signal reception circuit 415, a subtraction circuit 416, an addition circuit 419, and an amplifier 420. These components constitute the high-speed bus interface 353. Furthermore, the audio amplifier 302 includes a pull-down resistor 431, a resistor 432, a capacitor 433, and a comparator 434 constituting a plug connection detection circuit 430. Here, the resistor 432 and the capacitor 433 constitute a low pass filter.

A series circuit of the AC coupling capacitor 413, the termination resistor 412, and the AC coupling capacitor 414 is connected between a 14 pin terminal 511 and a 19 pin terminal 512 of the HDMI terminal 351. A connection point P1 between the AC coupling capacitor 413 and the termination resistor 412 is connected to a positive output side of the LAN signal transmission circuit 411 and is connected to a positive input side of the LAN signal reception circuit 415.

A connection point P2 between the AC coupling capacitor 414 and the termination resistor 412 is connected to a negative output side of the LAN signal transmission circuit 411 and is connected to a negative input side of the LAN signal reception circuit 415. A transmission signal (transmission data) SG411 is supplied from the Ethernet interface 360 to an input side of the LAN signal transmission circuit 411.

An output signal SG412 of the LAN signal reception circuit 415 is supplied to a positive terminal of the subtraction circuit 416, and a transmission signal (transmission data) SG411 is supplied to a negative terminal of the subtraction circuit 416. In the subtraction circuit 416, the transmission signal SG411 is subtracted from the output signal SG412 of the LAN signal reception circuit 415, and the reception signal SG413 is obtained. In a case where a LAN signal (Ethernet signal) is transmitted as a differential signal via the reserve line and the HPD line, the reception signal SG413 is the LAN signal. The reception signal SG413 is supplied to the Ethernet interface 360.

A connection point Q2 between the AC coupling capacitor 414 and the 19 pin terminal 512 is connected to the ground line via the pull-down resistor 431 and is connected to the ground line via a series circuit of the resistor 432 and the capacitor 433. Then, an output signal of the low pass filter obtained at a connection point between the resistor 432 and the capacitor 433 is supplied to one input terminal of the comparator 434. In the comparator 434, the output signal of the low pass filter is compared with a reference voltage Vref2 (+1.4 V) supplied to another input terminal. An output signal SG415 of the comparator 434 is supplied to a control unit (CPU) (not illustrated) of the audio amplifier 302.

Furthermore, the connection point P1 between the AC coupling capacitor 413 and the termination resistor 412 is connected to one input terminal of the addition circuit 419. Furthermore, the connection point P2 between the AC coupling capacitor 414 and the termination resistor 412 is connected to another input terminal of the addition circuit 419. An output signal of the addition circuit 419 is supplied to the SPDIF reception circuit 354 via the amplifier 420. In a case where the SPDIF signal is transmitted as an in-phase signal via the reserve line and the HPD line, the output signal of the addition circuit 419 is the SPDIF signal.

In the AV system 30 illustrated in FIG. 17. For example, a case will be considered where a MIDI signal corresponding to a background performance of karaoke is output from the content reproduction circuit 318 on the television receiver 301 side. In this case, lyrics and a musical score are displayed on the display 322 on the basis of the information supplied from the content reproduction circuit 318. In this state, it is assumed that the user sings toward the microphone 306 and performs ad-lib performance by using the MIDI keyboard 305 in an interlude part.

In this case, in the SPDIF transmission circuit 314, an SPDIF signal is generated that includes a linear PCM signal according to the user's singing and a MIDI signal (MIDI signal obtained by synthesizing a MIDI signal corresponding to background performance, and a MIDI signal corresponding to ad-lib performance using the MIDI keyboard 305), and the SPDIF signal is transmitted to the audio amplifier 302 through the high-speed bus interface 313.

In this case, on the audio amplifier 302 side, in the SPDIF reception circuit 354, the SPDIF signal is received from the television receiver 301 through the high-speed bus interface 353, and the linear PCM signal and the MIDI signal included in the SPDIF signal are separated and extracted. Then, in the MIDI sound source unit 356, a linear PCM signal is obtained that corresponds to performance sounds of the background performance and the ad-lib performance on the basis of the MIDI signal.

In the audio mixer 357, the linear PCM signal corresponding to the performance sounds of the background performance and the ad-lib performance, and the linear PCM signal corresponding to a singing sound of the user extracted by the SPDIF reception circuit 354 are synthesized. Then, the synthesized linear PCM signal is amplified by the amplifier 358 and supplied to the speaker system 308. As a result, from the speaker system 308, a reproduction sound is obtained in which the performance sounds of the background performance and the ad-lib performance and the user's singing sound are synthesized.

As described above, in the AV system 30 illustrated in FIG. 17, the SPDIF signal (signals consecutive in sub-frame units) transmitted from the television receiver 301 to the audio amplifier 302 includes the linear PCM signal (audio signal) and the MIDI signal. As a result, simultaneous transmission of the linear PCM signal and the MIDI signal from the television receiver 301 to the audio amplifier 302 can be stably performed without delay, and generation and reproduction of the synthesized sound can be satisfactorily performed in the audio amplifier 302.

4. Fourth Embodiment

[Configuration Example of Game System]

Figure 21:
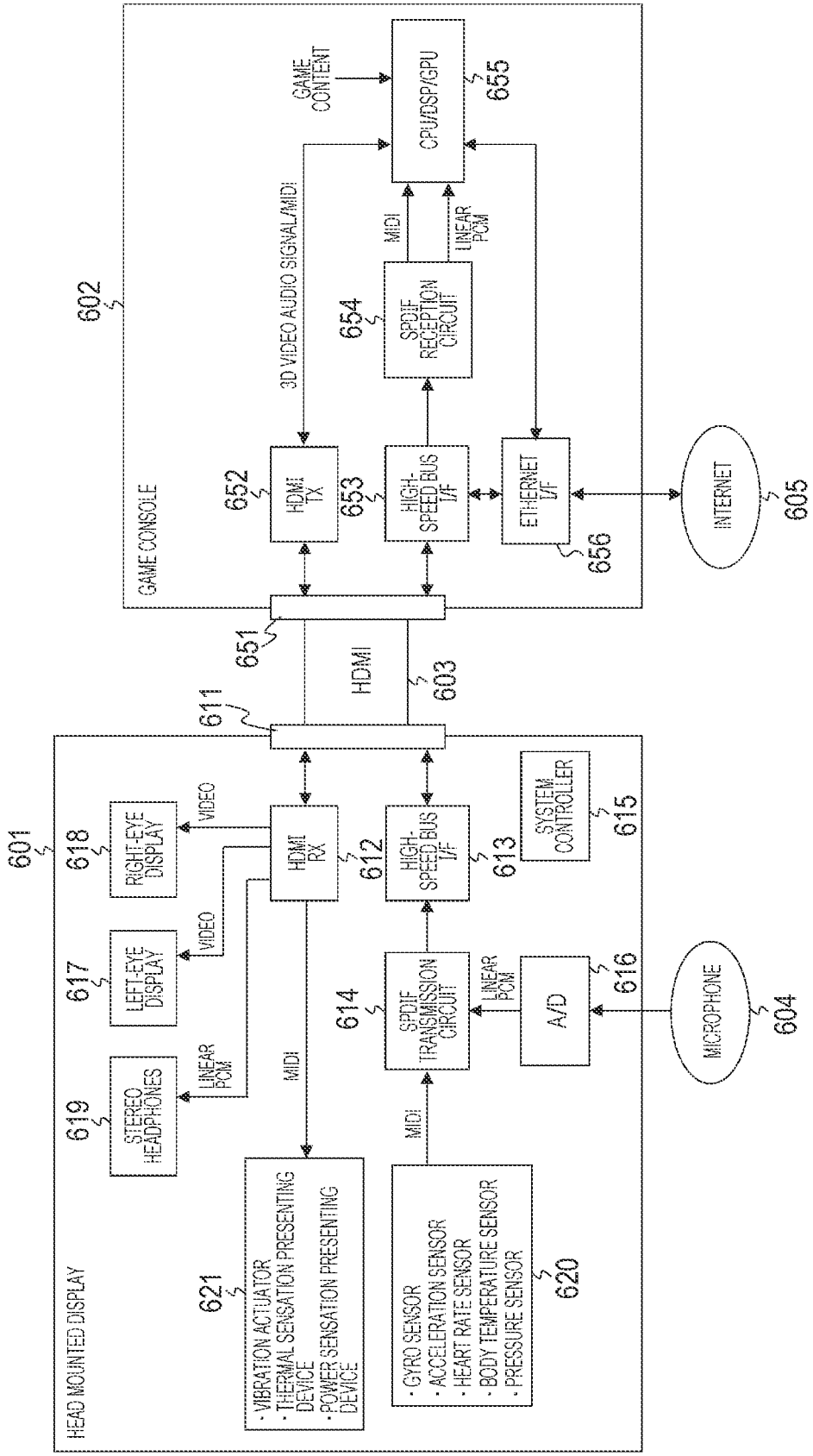
FIG. 21 is a block diagram illustrating a configuration example of a game system as a fourth embodiment.

FIG. 21 illustrates a configuration example of a game system 60 as a fourth embodiment. The game system 60 is a system that decodes a game content, and progresses a game while sensing movement of a game user.

A MIDI signal is also applied to mixer control, illumination control, machine control, and the like in addition to control of an instrument sound source. For example, a value of a fader can be controlled remotely. That is, transmission and reception of a specific value can be performed at an arbitrary timing, and this can be used for transmission of values of various sensors, temperature setting of a thermal sensation presenting device, and the like. Furthermore, synthesizing is possible as a sound having a low frequency in a vibration actuator.

The game system 60 includes a head mounted display 601 and a game console 602. A microphone 604 is connected to the head mounted display 601. Furthermore, the Internet 605 is connected to the game console 602.

The head mounted display 601 and the game console 602 are connected to each other via an HDMI cable 603. The head mounted display 601 is provided with an HDMI terminal 611 to which an HDMI reception unit (HDMI RX) 612 and a high-speed bus interface 613 constituting a communication unit are connected. The game console 602 is provided with an HDMI terminal 651 to which an HDMI transmission unit (HDMI TX) 652 and a high-speed bus interface 653 constituting a communication unit are connected. One end of the HDMI cable 603 is connected to the HDMI terminal 611 of the head mounted display 601, and another end thereof is connected to the HDMI terminal 651 of the game console 602.

"Configuration of Head Mounted Display"

The head mounted display 601 includes the HDMI reception unit 612, the high-speed bus interface 613, and an SPDIF transmission circuit 614. Furthermore, the head mounted display 601 includes a system controller 615, an A/D converter 616, a left-eye display 617, a right-eye display 618, and stereo headphones 619. Moreover, the head mounted display 601 includes a sensor unit 620 including a gyro sensor, an acceleration sensor, a heart rate sensor, a body temperature sensor, a pressure sensor, and the like, and a controlled unit 621 including a vibration actuator, a thermal sensation presenting device, a power sensation presenting device, and the like.

The system controller 615 controls operation of each unit of the head mounted display 601. Similarly to the high-speed bus interface 313 in the television receiver 301 of the AV system 30 described above, the high-speed bus interface 613 is an interface of a bidirectional communication path configured using a reserve line and a hot plug detect (HPD) line constituting the HDMI cable 603.

The A/D converter 616 converts an analog audio signal related to an utterance of the game user (wearer of the head mounted display 601) obtained by collecting sound by the microphone 604 into a linear PCM signal and transmits the linear PCM signal to the SPDIF transmission circuit 614.

Similarly to the SPDIF transmission circuit 110 in the transmission device 101 of the transmission/reception system 10 described above, the SPDIF transmission circuit 614 is a circuit for transmitting an SPDIF signal (IEC 60958 standard digital audio transmission signal), and is a transmission circuit conforming to the IEC 60958 standard.

Similarly to the SPDIF transmission circuit 110, the SPDIF transmission circuit 614 generates an SPDIF signal simultaneously including the linear PCM signal and the MIDI signal, and transmits the SPDIF signal to the game console 602 through the high-speed bus interface 613. Here, the linear PCM signal included in the SPDIF signal is a linear PCM signal related to the utterance of the game user obtained by the A/D converter 616. Furthermore, the MIDI signal included in the SPDIF signal is a MIDI signal having detection signals of various sensors obtained by the sensor unit 620.

Similarly to the HDMI reception unit 312 in the television receiver 301 of the AV system 30 described above, the HDMI reception unit 612 receives image and audio data supplied to the HDMI terminal 611 through the HDMI cable 603 by communication conforming to HDMI. Here, the HDMI reception unit 612 receives a 3D video audio signal and the MIDI signal transmitted from the game console 602.

In this case, the SPDIF signal (see FIG. 6) including the stereo 2-channel audio signal (linear PCM signal as an audio signal) and the MIDI signal is mapped to an audio sample packet and transmitted. In the HDMI reception unit 612, the stereo 2-channel audio signal and the MIDI signal as control information are extracted from the SPDIF signal.

A left-eye video signal obtained by the HDMI reception unit 612 is transmitted to the left-eye display 617, and a left-eye image is displayed on the left-eye display 617. Furthermore, a right-eye video signal obtained by the HDMI reception unit 612 is transmitted to the right-eye display 618, and a right-eye image is displayed on the right-eye display 618. The user can perceive a stereoscopic image related to the game content from the left-eye image and the right-eye image. Furthermore, the stereo 2-channel audio signal obtained by the HDMI reception unit 612 is transmitted to the stereo headphones 619, and stereo sound related to the game content is reproduced.

Furthermore, the MIDI signal as the control information obtained by the HDMI reception unit 601 is transmitted to the controlled unit 621. In the controlled unit 621, an actuator and a device are controlled on the basis of the MIDI signal. As a result, vibration, thermal sensation, power sensation, and the like related to the game content are given to the game user.

"Configuration of Game Console"

The game console 602 includes the HDMI transmission unit 652, the high-speed bus interface 653, and an SPDIF reception circuit 654. Furthermore, the game console 602 includes a game control processing unit 655 and an Ethernet interface unit 656.

Similarly to the high-speed bus interface 353 in the audio amplifier 302 of the AV system 30 described above, the high-speed bus interface 653 is an interface of a bidirectional communication path configured using a reserve line and a hot plug detect (HPD) line constituting the HDMI cable 603. The Ethernet interface 656 communicates with an external server (cloud server) via the Internet 605. The Ethernet interface 656 streams a game content from a cloud server that provides a game service, for example.

Similarly to the SPDIF reception circuit 120 in the reception device 102 of the transmission/reception system 10 described above, the SPDIF reception circuit 654 is a circuit for receiving an SPDIF signal and is a reception circuit conforming to the IEC 60958 standard.

The SPDIF reception circuit 654 receives the SPDIF signal from the television receiver 301 through the high-speed bus interface 653, and extracts and outputs the linear PCM signal and the MIDI signal included in the SPDIF signal. In this embodiment, the linear PCM signal is a linear PCM signal related to the utterance of the game user as described above. Furthermore, the MIDI signal is a MIDI signal having detection signals of various sensors as described above.

The game control processing unit 655 includes a CPU, a DSP, a GPU, and the like. The game control processing unit 655 decodes the game content, and generates the 3D video audio signal and the MIDI signal by referring to the MIDI signal and the linear PCM signal obtained by the SPDIF reception circuit 354. Here, the 3D video audio signal includes the left-eye video signal, the right-eye video signal, and the stereo 2-channel audio signal (linear PCM signal). Furthermore, the MIDI signal is a MIDI signal having a control signal for giving the vibration, thermal sensation, power sensation, and the like related to the game content, to the game user.

Similarly to the HDMI transmission unit 352 in the audio amplifier 302 of the AV system 30 described above, the HDMI transmission unit 652 transmits image and audio data from the HDMI terminal 651 to the HDMI cable 603 by communication conforming to HDMI. Here, the 3D video audio signal and the MIDI signal are transmitted that are generated by the game control processing unit 655 as described above. In this case, the SPDIF signal (see FIG. 6) including the stereo 2-channel audio signal (linear PCM signal as an audio signal) and the MIDI signal is generated, and the SPDIF signal is mapped to the audio sample packet and transmitted.

As described above, in the game system 60 illustrated in FIG. 21, the SPDIF signal (signals consecutive in sub-frame units) transmitted from the head mounted display 601 to the game console 602 includes the linear PCM signal related to the utterance of the game user and the MIDI signal having detection signals of various sensors. As a result, simultaneous transmission of the linear PCM signal and the MIDI signal from the head mounted display 601 to the game console 602 can be stably performed without delay, and processing in the game control processing unit 655 can be satisfactorily performed in the game console 602.

Furthermore, in the game system 60 illustrated in FIG. 21, the SPDIF signal (signals consecutive in sub-frame units) transmitted from the game console 602 to the head mounted display 601 includes the stereo 2-channel audio signal (linear PCM signal as an audio signal) generated by the game control processing unit 655 and the MIDI signal having the control signal for giving the vibration, thermal sensation, power sensation, and the like related to the game content, to the game user. As a result, simultaneous transmission of the linear PCM signal and the MIDI signal from the game console 602 to the head mounted display 601 can be stably performed without delay, and audio reproduction sound given to the game user and the vibration, thermal sensation, power sensation, and the like given to the game user can be satisfactorily performed in a synchronized state without delay, in the head mounted display 601.

5. Modifications

Note that, in the above-described embodiment, an example has been described in which a coaxial cable or an optical cable, and further, an HDMI ARC or an HDMI transmission path are used as the IEC 60958 transmission path; however, a configuration using another IEC 60958 transmission path is also conceivable. For example, examples are also conceivable in which an IEC 61883-6 transmission path, an MHL transmission path, a display port transmission path (DP transmission path), and the like are used as the IEC 60958 transmission path. Also in these cases, the SPDIF signal (IEC 60958 signal) is mapped to an audio sample packet (audio sample packet) and transmitted in the same forward direction as video transmission.

Furthermore, the preferred embodiments of the present disclosure have been described in detail with reference to the accompanying drawings, but the technical scope of the present disclosure is not limited to such examples. It is obvious that persons having ordinary knowledge in the technical field of the present disclosure can conceive various modification examples or correction examples within the scope of the technical idea described in the claims, and it is understood that the modification examples or correction examples also belong to the technical scope of the present disclosure.

Furthermore, the effects described in the present specification are merely illustrative or exemplary and not restrictive. That is, the technology according to the present disclosure can exhibit other effects obvious to those skilled in the art from the description of the present specification together with the above-described effects or in place of the above-described effects.

Furthermore, the technology can also have a configuration as follows.

(1) A transmission device including
a transmission unit that transmits signals consecutive in predetermined units to a reception side via a predetermined transmission path, in which
the signals consecutive in the predetermined units include a signal of a first predetermined unit of the predetermined units including an audio signal and a signal of a second predetermined unit of the predetermined units including a MIDI signal.

(2) The transmission device according to (1), in which the predetermined units are sub-frame units.

(3) The transmission device according to (1) or (2), in which
the audio signal is a linear PCM signal constituting a stereo 2-channel audio signal.

(4) The transmission device according to any of (1) to (3), in which
the MIDI signal includes packet data of a predetermined length, and
the packet data of the predetermined length is divided into a plurality of pieces, and transmitted by being included in signals of a plurality of pieces of the second predetermined units.

(5) The transmission device according to (4), in which
the packet data of the predetermined length is 32-bit, 64-bit, 96-bit, or 128-bit packet data, and divided into a plurality of pieces of 16 bits each.

(6) The transmission device according to (4) or (5), in which
in the signal of the second predetermined unit including the MIDI signal, the MIDI signal is inserted on a lower bit side, and identification information is inserted on an upper bit side, the identification information identifying whether the MIDI signal inserted on the lower bit side is at least divided data of start or divided data of continuation.

(7) The transmission device according to (6), in which
the identification information is set to cause a volume to be less than or equal to a predetermined value even when data of a predetermined bit number including the MIDI signal on the lower bit side and the identification information on the upper bit side is reproduced as audio data.

(8) The transmission device according to any of (1) to (3), in which
packet data constituting the MIDI signal is inserted from an arbitrary bit position in a data payload area of the signal of the second predetermined unit, and in a case where all the packet data are not able to be inserted into the data payload area, remaining part of the packet data is inserted from a first bit position in a data payload area of the signal of a next one of a plurality of the second predetermined units, and the packet data constituting the MIDI signal is transmitted.

(9) The transmission device according to any of (1) to (3), in which
packet data of one byte constituting the MIDI signal is inserted into one byte area of a data payload area of two bytes in the signal of the second predetermined unit and transmitted.

(10) The transmission device according to any of (1) to (3), in which
packet data of one byte constituting the MIDI signal is inserted into one byte area of a data payload area of two bytes in the signal of the second predetermined unit, and another area of one byte is set as an extended byte area and transmitted.

(11) The transmission device according to any of (1) to (10), in which
the signal of the second predetermined unit includes a plurality of channels of the MIDI signals.

(12) The transmission device according to any of (1) to (11), further including
an information addition unit that adds, to the signals consecutive in the predetermined units, identification information that identifies that the signals include a signal of a first predetermined unit of the predetermined units including an audio signal and a signal of a second predetermined unit of the predetermined units including a MIDI signal.

(13) The transmission device according to (12), in which the information addition unit adds the identification information by using a predetermined bit area of each of blocks configured for each of a predetermined number of the predetermined units.

(14) The transmission device according to any of (1) to (13), in which
the predetermined transmission path is a coaxial cable, an optical cable, an Ethernet (IEC 61883-6) cable, an HDMI cable, an MHL cable, or a display port cable.

(15) A transmission method including
a procedure of transmitting signals consecutive in predetermined units to a reception side via a predetermined transmission path, in which
the signals consecutive in the predetermined units include a signal of a first predetermined unit of the predetermined units including an audio signal and a signal of a second predetermined unit of the predetermined units including a MIDI signal.

(16) A reception device including
a reception unit that receives signals consecutive in predetermined units from a transmission side via a predetermined transmission path, in which
the signals consecutive in the predetermined units include a signal of a first predetermined unit of the predetermined units including an audio signal and a signal of a second predetermined unit of the predetermined units including a MIDI signal.

(17) The reception device according to (16), in which
the audio signal is a linear PCM signal constituting a stereo 2-channel audio signal.

(18) The reception device according to (16) or (17), further including
a processing unit that performs processing using the audio signal and the MIDI signal.

(19) The reception device according to (18), in which
the processing unit synthesizes the audio signal with an audio signal obtained by using a MIDI sound source from the MIDI signal to obtain an output audio signal.

(20) A reception method including
a procedure of receiving signals consecutive in predetermined units from a transmission side via a predetermined transmission path, in which
the signals consecutive in the predetermined units include a signal of a first predetermined unit of the predetermined units including an audio signal and a signal of a second predetermined unit of the predetermined units including a MIDI signal.

REFERENCE SIGNS LIST

10 Transmission/reception system
101 Transmission device
102 Reception device
103 Transmission path
110 SPDIF transmission circuit
120 SPDIF reception circuit
20 Acoustic system
201 MIDI keyboard with microphone input
202 MIDI sound source module
203 Transmission path
204 Microphone
205 Amplifier
206 Speaker system
210 A/D converter
211 Keyboard unit
212 SPDIF transmission circuit
220 SPDIF reception circuit
221 MIDI sound source unit
222 Audio mixer
223 Display unit
30 AV system
301 Television receiver
302 Audio amplifier
303 HDMI cable
304 Internet
305 MIDI cable
306 Microphone
307 MIDI file storage unit
308 Speaker system
309 Reception antenna
311 HDMI terminal
312 HDMI reception unit
313 High-speed bus interface
314 SPDIF transmission circuit
315 System controller
316 User interface
317 Digital broadcast reception circuit
318 Content reproduction circuit
319 Audio synthesis circuit
320 A/D converter
321 Ethernet interface
322 Display
351 HDMI terminal
352 HDMI transmission unit
353 High-speed bus interface
354 SPDIF reception circuit
355 System controller
356 MIDI sound source unit
357 Audio mixer
358 Amplifier
359 Display unit
360 Ethernet interface
60 Game system
601 Head mounted display
602 Game console
603 HDMI cable
604 Microphone
605 Internet
611 HDMI terminal
612 HDMI reception unit
613 High-speed bus interface
614 SPDIF transmission circuit
615 System controller
616 A/D converter
617 Left-eye display
618 Right-eye display
619 Stereo headphones
620 Sensor unit
621 Controlled unit
651 HDMI terminal
652 HDMI transmission unit
653 High-speed bus interface
654 SPDIF reception circuit
655 Game control processing unit
656 Ethernet interface

The invention claimed is:

1. A transmission device comprising
a transmission unit configured to transmit signals consecutive in predetermined units to a reception side via a predetermined transmission path, wherein
the signals consecutive in the predetermined units include a signal of a first predetermined unit of the predetermined units including an audio signal and a signal of a second predetermined unit of the predetermined units including a MIDI signal transmitted consecutively to the reception side via the predetermined transmission path such that the audio signal and the MIDI signal follow one another in uninterrupted succession, and
the transmission unit is implemented via at least one processor.

2. The transmission device according to claim 1, wherein the predetermined units are sub-frame units.

3. The transmission device according to claim 1, wherein the audio signal is a linear PCM signal constituting a stereo 2-channel audio signal.

4. The transmission device according to claim 1, wherein the MIDI signal includes packet data of a predetermined length, and
the packet data of the predetermined length is divided into a plurality of pieces, and transmitted by being included in signals of a plurality of pieces of the second predetermined units.

5. The transmission device according to claim 4, wherein the packet data of the predetermined length is 32-bit, 64-bit, 96-bit, or 128-bit packet data, and divided into a plurality of pieces of 16 bits each.

6. The transmission device according to claim 4, wherein in the signal of the second predetermined unit including the MIDI signal, the MIDI signal is inserted on a lower bit side, and identification information is inserted on an upper bit side, the identification information identifying whether the MIDI signal inserted on the lower bit side is at least divided data of start or divided data of continuation.

7. The transmission device according to claim 6, wherein the identification information is set to cause a volume to be less than or equal to a predetermined value even when data of a predetermined bit number including the MIDI signal on the lower bit side and the identification information on the upper bit side is reproduced as audio data.

8. The transmission device according to claim 1, wherein packet data constituting the MIDI signal is inserted from an arbitrary bit position in a data payload area of the signal of the second predetermined unit, and in a case where all the packet data are not able to be inserted into the data payload area, remaining part of the packet data is inserted from a first bit position in a data payload area of the signal of a next one of a plurality of the second predetermined units, and the packet data constituting the MIDI signal is transmitted.

9. The transmission device according to claim 1, wherein packet data of one byte constituting the MIDI signal is inserted into one byte area of a data payload area of two bytes in the signal of the second predetermined unit and transmitted.

10. The transmission device according to claim 1, wherein packet data of one byte constituting the MIDI signal is inserted into one byte area of a data payload area of two bytes in the signal of the second predetermined unit, and another area of one byte is set as an extended byte area and transmitted.

11. The transmission device according to claim 1, wherein the signal of the second predetermined unit includes a plurality of channels of the MIDI signals.

12. The transmission device according to claim 1, further comprising
an information addition unit configured to add, to the signals consecutive in the predetermined units, identification information that identifies that the signals include a signal of a first predetermined unit of the predetermined units including an audio signal and a signal of a second predetermined unit of the predetermined units including a MIDI signal, wherein
the information addition unit is implemented via at least one processor.

13. The transmission device according to claim 12, wherein
the information addition unit is further configured to add the identification information by using a predetermined bit area of each of blocks configured for each of a predetermined number of the predetermined units.

14. The transmission device according to claim 1, wherein the predetermined transmission path is a coaxial cable, an optical cable, an Ethernet (IEC 61883-6) cable, an HDMI cable, an MHL cable, or a display port cable.

15. A transmission method comprising
transmitting signals consecutive in predetermined units to a reception side via a predetermined transmission path, wherein
the signals consecutive in the predetermined units include a signal of a first predetermined unit of the predetermined units including an audio signal and a signal of a second predetermined unit of the predetermined units including a MIDI signal transmitted consecutively to the reception side via the predetermined transmission path such that the audio signal and the MIDI signal follow one another in uninterrupted succession.

16. A reception device comprising
a reception unit configured to receive signals consecutive in predetermined units from a transmission side via a predetermined transmission path, wherein
the signals consecutive in the predetermined units include a signal of a first predetermined unit of the predetermined units including an audio signal and a signal of a second predetermined unit of the predetermined units including a MIDI signal received consecutively from the transmission side via the predetermined transmission path such that the audio signal and the MIDI signal follow one another in uninterrupted succession, and
the reception unit is implemented via at least one processor.

17. The reception device according to claim 16, wherein the audio signal is a linear PCM signal constituting a stereo 2-channel audio signal.

18. The reception device according to claim 16, further comprising
a processing unit configured to perform processing using the audio signal and the MIDI signal, wherein
the processing unit is implemented via at least one processor.

19. The reception device according to claim 18, wherein the processing unit is further configured to synthesize the audio signal with an audio signal obtained by using a MIDI sound source from the MIDI signal to obtain an output audio signal.

20. A reception method comprising
receiving signals consecutive in predetermined units from a transmission side via a predetermined transmission path, wherein
the signals consecutive in the predetermined units include a signal of a first predetermined unit of the predetermined units including an audio signal and a signal of a second predetermined unit of the predetermined units including a MIDI signal received consecutively from the transmission side via the predetermined transmission path such that the audio signal and the MIDI signal follow one another in uninterrupted succession.

* * * * *